(12) United States Patent
Bowles et al.

(10) Patent No.: US 9,573,263 B2
(45) Date of Patent: Feb. 21, 2017

(54) WORK TOOLS HAVING INTERCHANGEABLE WORK HEADS

(71) Applicant: Ridge Tool Company, Elyria, OH (US)

(72) Inventors: Richard R. Bowles, Solon, OH (US); Robert M. Baracskai, North Ridgeville, OH (US); Beat Schweizer, Titterten/BL (CH); Rudolf Kreuzer, Buchs/AG (CH); Marc Lütolf, Kembs (FR)

(73) Assignee: Ridge Tool Company, Elyria, OH (US)

( * ) Notice: Subject to any disclaimer, the term of this patent is extended or adjusted under 35 U.S.C. 154(b) by 435 days.

(21) Appl. No.: 14/287,171

(22) Filed: May 26, 2014

(65) Prior Publication Data

US 2014/0260505 A1    Sep. 18, 2014

Related U.S. Application Data

(63) Continuation-in-part of application No. 13/449,821, filed on Apr. 18, 2012, now Pat. No. 9,242,422, and a
(Continued)

(51) Int. Cl.
*B25F 3/00* (2006.01)
*B25F 5/00* (2006.01)
(Continued)

(52) U.S. Cl.
CPC .............. *B25F 3/00* (2013.01); *B23B 31/1071* (2013.01); *B23B 31/22* (2013.01);
(Continued)

(58) Field of Classification Search
CPC ................. B23B 31/1071; B23B 31/22; B23B 2260/022; B30B 14/026; B30B 15/026;
Y10T 279/17145; Y10T 279/17196; Y10T 279/177752; Y10T 279/17811; B25F 3/00; B25F 5/005; F16B 21/165; B25B 23/0035; B25B 27/10; B26D 7/2614; B26F 1/40
(Continued)

(56) References Cited

U.S. PATENT DOCUMENTS 3,583,715 A * 6/1971 Jahrl .................... B23B 31/1071
279/75
3,937,055 A    2/1976 Caruso et al.
(Continued)

FOREIGN PATENT DOCUMENTS

DE    1108528    6/1961
DE    2426760    1/1975
(Continued)

OTHER PUBLICATIONS

Thorne & Derrick UK; "Generation Safety Plus"; www.cablejoints.co.uk; 16 pages.
(Continued)

*Primary Examiner* — David B Jones
(74) *Attorney, Agent, or Firm* — Mark E. Bandy; Rankin, Hill & Clark LLP

(57) ABSTRACT

A hand-held hydraulic assembly includes a work tool having a hydraulic cylinder or main body, a ram piston disposed in the hydraulic main body and a spring or other biasing member mounted on the ram piston. An interchangeable work head is selectively engaged to the ram piston of the work tool. The ram piston is axially displaceable in the main body for actuating the work head. A quick release coupling mounted to the work tool releasably connects the interchangeable work head to the work tool.

39 Claims, 21 Drawing Sheets

Related U.S. Application Data continuation-in-part of application No. 13/449,770, filed on Apr. 18, 2012, now Pat. No. 9,434,119.

(60) Provisional application No. 61/827,842, filed on May 28, 2013.

(51) Int. Cl.

| | | |
|---|---|---|
| *B23B 31/22* | (2006.01) | |
| *B23B 31/107* | (2006.01) | |
| *B25B 23/00* | (2006.01) | |
| *B26D 7/26* | (2006.01) | |
| *B30B 15/02* | (2006.01) | |
| *B25B 27/10* | (2006.01) | |
| *B26F 1/40* | (2006.01) | |
| *F16B 21/16* | (2006.01) | |

(52) U.S. Cl.
CPC .......... *B25B 23/0035* (2013.01); *B25B 27/10* (2013.01); *B25F 5/005* (2013.01); *B26D 7/2614* (2013.01); *B30B 15/026* (2013.01); *B26F 1/40* (2013.01); *F16B 21/165* (2013.01)

(58) Field of Classification Search
USPC ...................................................... 72/453.13
See application file for complete search history.

(56) References Cited

U.S. PATENT DOCUMENTS

| | | | |
|---|---|---|---|
| 3,947,047 A | 3/1976 | Hultman | |
| 4,107,949 A * | 8/1978 | Wanner ................ | B25D 17/088 279/75 |
| 4,111,592 A | 9/1978 | Schnitzler | |
| RE31,755 E | 12/1984 | Wanner | |
| 4,979,279 A * | 12/1990 | Garvey ................. | B21J 15/022 29/252 |
| 5,003,847 A | 4/1991 | Wagner | |
| 5,209,153 A | 5/1993 | Araki et al. | |
| 5,253,554 A | 10/1993 | Riera et al. | |
| 5,730,022 A | 3/1998 | Hansson et al. | |
| 5,957,634 A | 9/1999 | Carpinetti | |
| 6,324,768 B1 | 12/2001 | Wellman | |
| 6,324,884 B1 | 12/2001 | Barjesteh et al. | |
| 6,461,089 B2 | 10/2002 | Adrian et al. | |
| 6,511,268 B1 | 1/2003 | Vasudeva et al. | |
| 6,718,870 B1 | 4/2004 | Frenken | |
| 6,953,196 B1 * | 10/2005 | Huang ................ | B23B 31/1071 279/155 |
| 7,140,817 B1 * | 11/2006 | Phillips ................ | B23B 31/008 144/136.95 |
| 7,520,495 B2 | 4/2009 | Stark | |
| 9,162,353 B2 * | 10/2015 | Ciotti ....................... | B25F 3/00 |
| 9,242,422 B2 * | 1/2016 | Schweizer .......... | B23B 31/1071 |
| 9,434,119 B2 * | 9/2016 | Schweizer .......... | B23B 31/1071 |
| 2002/0017753 A1 | 2/2002 | Adrian et al. | |
| 2004/0161313 A1 | 8/2004 | Nordlin et al. | |
| 2005/0120770 A1 | 6/2005 | Frenken | |
| 2007/0063403 A1 | 3/2007 | Stark | |
| 2010/0005849 A1 | 1/2010 | College | |
| 2012/0319398 A1 | 12/2012 | Schweizer et al. | |
| 2012/0319399 A1 | 12/2012 | Schweizer et al. | |
| 2014/0260505 A1 * | 9/2014 | Bowles .................... | B25F 3/00 72/453.16 |

FOREIGN PATENT DOCUMENTS

| | | |
|---|---|---|
| DE | 2614531 | 10/1976 |
| DE | 2551125 | 5/1977 |
| DE | 2614532 | 9/1977 |
| DE | 20012706 | 9/2000 |
| DE | 10046869 | 4/2002 |
| DE | 20312887 | 10/2003 |
| DE | 202009010128 | 10/2009 |
| EP | 1084798 | 3/2001 |
| EP | 1244187 | 9/2002 |
| EP | 2535128 | 12/2012 |
| EP | 2535177 | 12/2012 |
| FR | 2437910 | 4/1980 |
| FR | 2649028 | 1/1991 |
| JP | 3042199 | 2/1991 |
| WO | 9847653 | 10/1998 |
| WO | 2004091862 | 10/2004 |
| WO | 2010128131 | 11/2010 |
| WO | 2012171732 | 12/2012 |
| WO | 2013152549 | 10/2013 |

OTHER PUBLICATIONS

EK 60 UNV-L Battery Powered universal tool 6-300 mm2; www.klauke.com/katalog/en/ek-60-unv-l-11972; 3 pages.
International Search Report (ISR) and Written Opinion, PCT/US2014/039473, Oct. 3, 2014, 10 pages.

* cited by examiner

WORK TOOLS HAVING INTERCHANGEABLE WORK HEADS

CROSS REFERENCES TO RELATED APPLICATIONS

This application claims priority from U.S. provisional application Ser. No. 61/827,842 filed on May 28, 2013. This application is also a continuation-in-part (CIP) application of U.S. application Ser. No. 13/449,821 filed Apr. 18, 2012. This application is also a continuation-in-part (CIP) application of U.S. application Ser. No. 13/449,770 filed Apr. 18, 2012.

FIELD

The present subject matter relates to hydraulic tools and interchangeable work heads. More particularly, the present subject matter relates to interchangeable and detachable work heads for use with a work tool, such as a hand-held hydraulic crimp, cutting, punch or press device.

BACKGROUND

Hydraulic work tools are employed in numerous applications to provide a user with a desired mechanical advantage. One example is in crimping tools used for making crimping connections, such as crimping terminals onto conductors. Another example is in cutting tools where the tool enables the user to apply a relatively large amount of force or pressure. In order to perform these different applications with one work tool, a detachable work head system is desired. Using the same work tool with different detachable/interchangeable work heads, it is possible to change over to different applications where necessary.

Conventional hydraulic work tools typically include a work head having tooling appropriate for the particular application, and an actuator coupled to the work head for driving the tooling. Hydraulic mechanisms are often employed in tool actuators. For example, the work head can include a fixed die holder and movable die holder and die that are hydraulically driven towards the fixed die to perform an operation. The actuator can include a hydraulic pump that is operated either manually or by an electric driven motor to either directly or indirectly drive the movable die of the work head. Some current work tools have work heads with tooling that simply close and open. It is also known to have a detachable work head including a linearly displaceable component and a biasing member to provide a biasing action for returning the movable die of the work head to a fully retracted, open position.

Although satisfactory in certain respects, a need remains for a system of work heads and work tools which can be interchanged with greater ease and reliability. Furthermore, it would be desirable to ensure that upon attaching a work head to a tool, that the attachment is secure and the tool is in proper position and engagement with the tool.

SUMMARY

The difficulties and drawbacks associated with previous approaches are addressed in the present subject matter as follows.

In one aspect, the present subject matter provides a hydraulic system comprising a work tool including a housing, a hydraulic cylinder or main body within the housing, a ram piston disposed in the hydraulic main body and positionable between a fully retracted position and a fully extended position, and biasing provisions associated with the ram piston and configured to bias the ram piston to the fully retracted position. The hydraulic system also comprises a quick release coupling mounted to the work tool for releasably connecting an interchangeable work head to the work tool. Upon positioning the ram piston to the fully retracted position, a distal end of the ram piston extends outwardly and beyond the quick release coupling.

In another aspect, the present subject matter provides a hand-held hydraulic assembly comprising a work tool having a hydraulic cylinder or main body, a ram piston disposed in the hydraulic main body and a compression type spring mounted on the ram piston. The hydraulic assembly also comprises a quick release coupling mounted to the work tool for releasably connecting an interchangeable work head to the work tool. The coupling includes (i) a generally cylindrical ball holding part defining a plurality of ball guide apertures and an open end, the ball holding part engaged with the cylinder or body of the work tool, (ii) a generally cylindrical locking ring disposed on the ball holding part and axially positionable thereon between an unlocked position and a locked position, and (iii) a plurality of balls disposed in the ball guide apertures defined in the ball holding part.

In another aspect, the present subject matter provides a work head adapted for selective engagement with, and disengagement from a hydraulic work tool. The work tool has a hydraulic cylinder or main body, a ram piston disposed in the hydraulic main body displaceable between extended and retracted positions, and a biasing member engaged with the ram piston. The biasing member is configured to bias the ram piston to the retracted position. The work head comprises a guide assembly including engagement provisions for engaging a workpiece and performing at least one operation on the workpiece. The engagement provisions are positionable between an extended position and a retracted position. The guide assembly includes a generally cylindrical member aligned with and that receives a distal end of the ram piston upon engagement of the work head with a work tool.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 2:
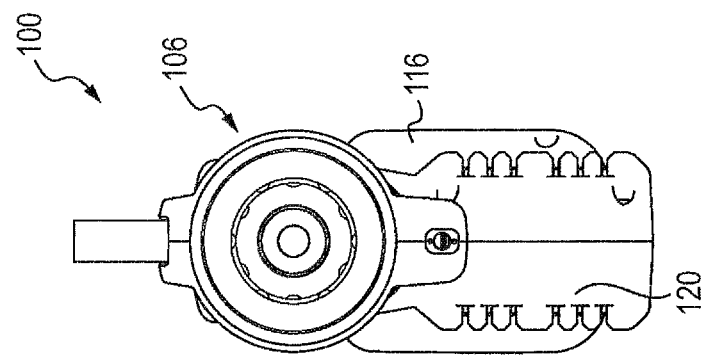
FIG. 2 is an end view of the work tool of FIG. 1

It should, of course, be understood that the description and drawings herein are merely illustrative and that various modifications and changes can be made in the structures disclosed without departing from the present disclosure. In general, the figures of the exemplary work tool and detachable work heads are not necessarily to scale. It will also be appreciated that the various identified components of the exemplary work tool and detachable work heads disclosed herein are merely terms of art that may vary from one manufacturer to another and should not be deemed to limit the present disclosure.

The present disclosure generally relates to hydraulic tools and particularly to selectively attachable work heads and quick release couplings for such tools. In certain versions of the present disclosure which are described in greater detail herein, the work tools are in the form of hand-held hydraulic work tools. Typically, the work tools include a hydraulic cylinder or main body, a ram piston disposed in the hydraulic main body and which is displaceable between extended and retracted positions and positions therebetween. The work tools also include a biasing member engaged with the ram piston. The biasing member is configured to bias the ram piston to the retracted position. The work heads generally include a yoke or guide assembly and engagement provisions for engaging a workpiece such as a cable lug or pipe fitting for example, and performing one or more operations on the workpiece. The engagement provisions typically can be positioned between an extended position and a retracted position, and to any position therebetween. In many of the work head versions described herein, the yoke assembly defines a bore and typically a cylindrical bore extending through the yoke assembly. Upon engagement or attachment with a work tool, the bore is aligned with or extends in a direction parallel and collinearly with a longitudinal axis and/or direction of travel of the ram piston.

In particular versions of the work heads, biasing provisions are included which urge or bias the engagement provisions of the work head to a retracted or open position. The biasing provisions can be in the form of springs and are typically disposed in the bore defined in the yoke assembly or guide assembly.

In other versions of the work heads, the work heads are free of biasing provisions to urge or bias the engagement provisions to any particular position or state particularly when disengaged from a work tool. Such work heads generally include a slidable member associated with the yoke assembly and engaged with the engagement provisions of the yoke assembly. The slidable member of the yoke assembly or guide assembly additionally includes radially outwardly biased engagement provisions for providing selective engagement between the slidable member and the ram piston of the work tool. These and other aspects of the various tools and work heads of the present disclosure are described in greater detail herein.

In certain versions of the present disclosure, a hand-held hydraulic assembly comprises a work tool having a hydraulic cylinder or main body, a ram piston disposed in the hydraulic main body and a compression type spring mounted on the ram piston. An interchangeable work head is selectively engaged to the ram piston of the work tool. The ram piston is axially displaceable in the main body for actuating the work head. A quick release coupling mounted to the work tool releasably connects the interchangeable work head to the work tool.

In certain other versions of the present disclosure, a work head adapted for selective engagement and disengagement from a hydraulic work tool is provided. The work tool has a hydraulic cylinder or main body, a ram piston disposed in the hydraulic main body displaceable between extended and retracted positions, and a biasing member engaged with the ram piston. The biasing member is configured to bias the ram piston to the retracted position. The work head comprises a yoke or guide assembly including engagement provisions for engaging a workpiece and performing at least one operation on the workpiece. The engagement provisions are positionable between an extended position and a retracted position. The yoke or guide assembly defines a bore aligned with the ram piston upon engagement of the work head with a work tool. The work head also comprises biasing provisions disposed in the bore of the yoke or guide assembly. The biasing provisions are configured to bias the engagement provisions to a retracted position.

In still other versions of the present disclosure, a work head adapted for selective engagement and disengagement from a hydraulic work tool is provided. The work tool has a hydraulic cylinder or main body, a ram piston disposed in the hydraulic main body displaceable between extended and retracted positions, and a biasing member engaged with the ram piston. The biasing member is configured to bias the ram piston to the retracted position. The work head comprises a yoke or guide assembly including engagement provisions for engaging a workpiece and performing at least one operation on the workpiece. The engagement provisions are positionable between an extended position and a retracted position. The yoke or guide assembly defines a bore aligned with the ram piston upon engagement of the work head with a work tool. The work head also comprises a slidable member disposed in the bore of the yoke or guide assembly and engaged with the engagement provisions. The slidable member includes radially outwardly biased engagement provisions for providing selective engagement between the slidable member and the ram piston of the work tool.

Figure 1:
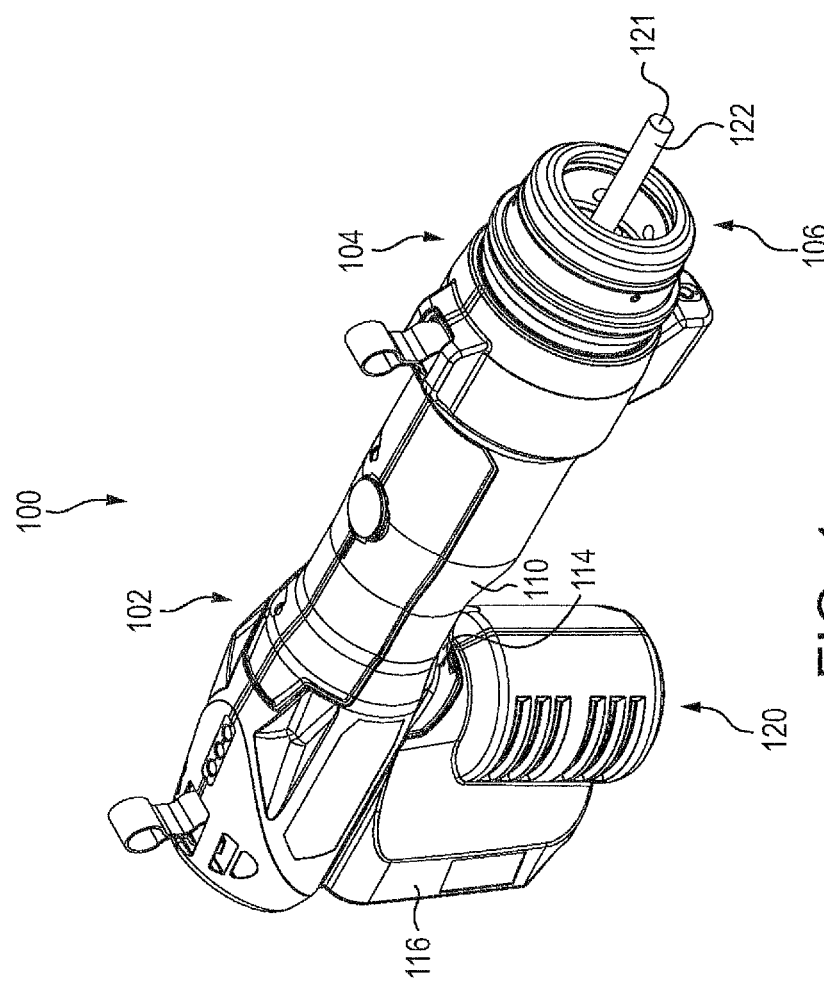
FIG. 1 is a perspective view of a hydraulic work tool having a quick-connect coupling for a detachable work head in accordance with the present disclosure.

Referring now to the drawings, wherein like numerals refer to like parts throughout the several views, FIGS. 1 and 2 illustrate a work tool 100 of a hand-held hydraulic assembly, in the form of, for example, a pressing tool, including a housing 102 having a nose end 104 at which one or more detachable/interchangeable work heads are selectively and removably attached via a quick release coupling 106. A central portion of the housing 102 can define a handle 110 for grasping the tool 100. The work tool 100 further includes an operation switch (not shown) provided near the nose end 104 for activating the work head (not shown), a hydraulic release switch 114, and an optional on-board power source (not shown), such as a battery pack, that is received in a receptacle 116 provided on the housing 110 for providing power to a motor 120. The motor 120 is mounted or otherwise retained within a lower cylindrically shaped portion of the housing 102 as shown in the referenced figures and so the motor 120 is generally hidden from view. It will be appreciated that the work tool 100 can alternatively receive electrical power via one or more cords (not shown). It will also be appreciated that the work tool 100 can be a manual pump action hydraulic tool or a remote access hose connected hydraulic tool. Representative embodiments of these tool configurations are described in greater detail herein.

As will be described in greater detail below, the work tool 100 further comprises a hydraulically actuated piston assembly 122 housed in the housing 102 that is used to actuate the work head connected thereto. In many embodiments, a distal end 121 of the piston assembly 122 extends outward and beyond the quick release coupling 106. And in certain embodiments, the distal end 121 of the ram piston extends outwardly and beyond the quick release coupling 106 when the ram piston is in its fully retracted position in the hydraulic tool. This configuration facilitates alignment and engagement of a work tool with the quick release coupling, to a work head. In addition, this configuration enables visual inspection of the distal end of the ram piston. These and other aspects are described in greater detail herein.

Figure 3:
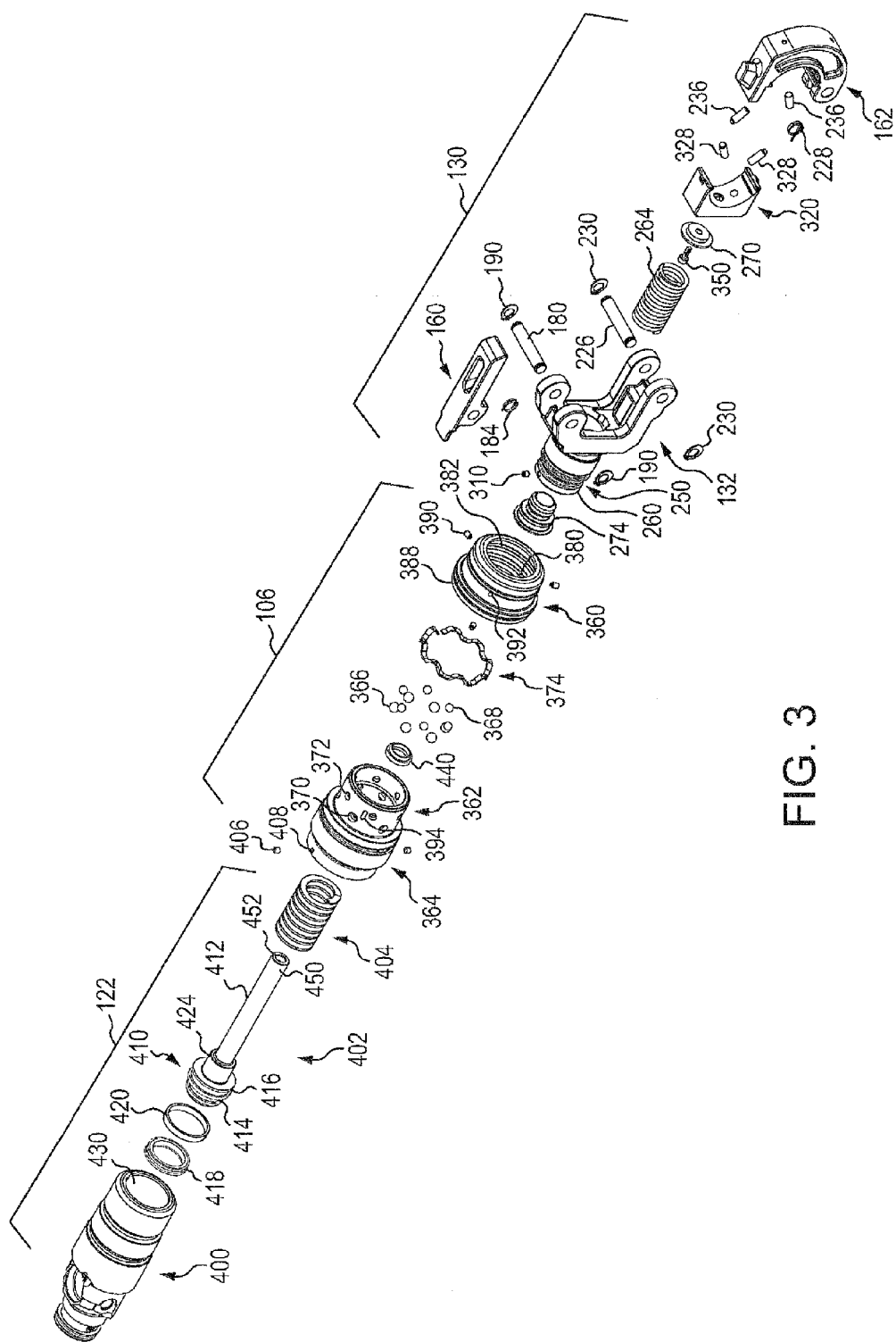
FIG. 3 is an exploded view of a portion of a hydraulically actuated piston assembly and quick-connect coupling of the work tool of FIG. 1 and an exemplary work head for the work tool of FIG. 1 according to one aspect of the present disclosure.
Figure 4:
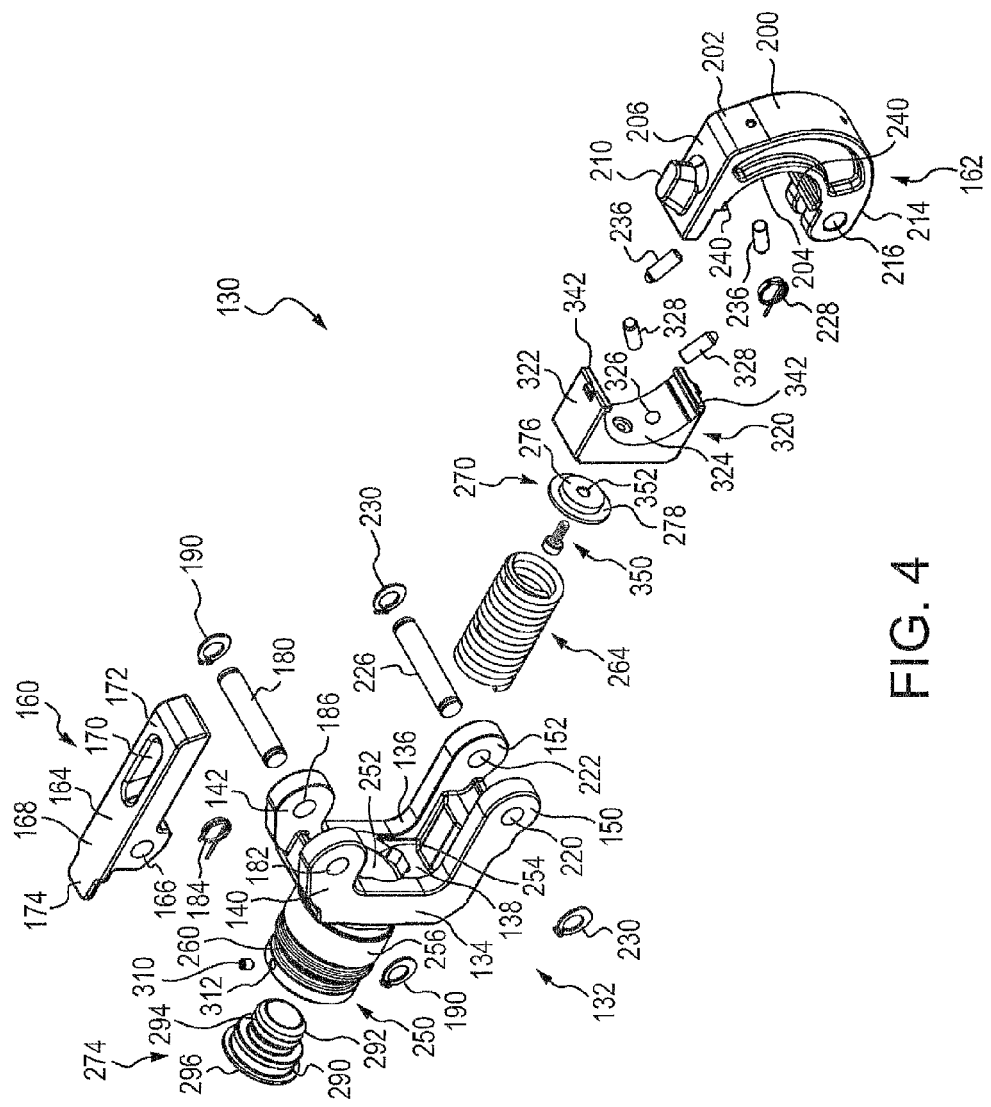
FIG. 4 is an enlarged exploded view of the work head of FIG. 3.
Figure 5:
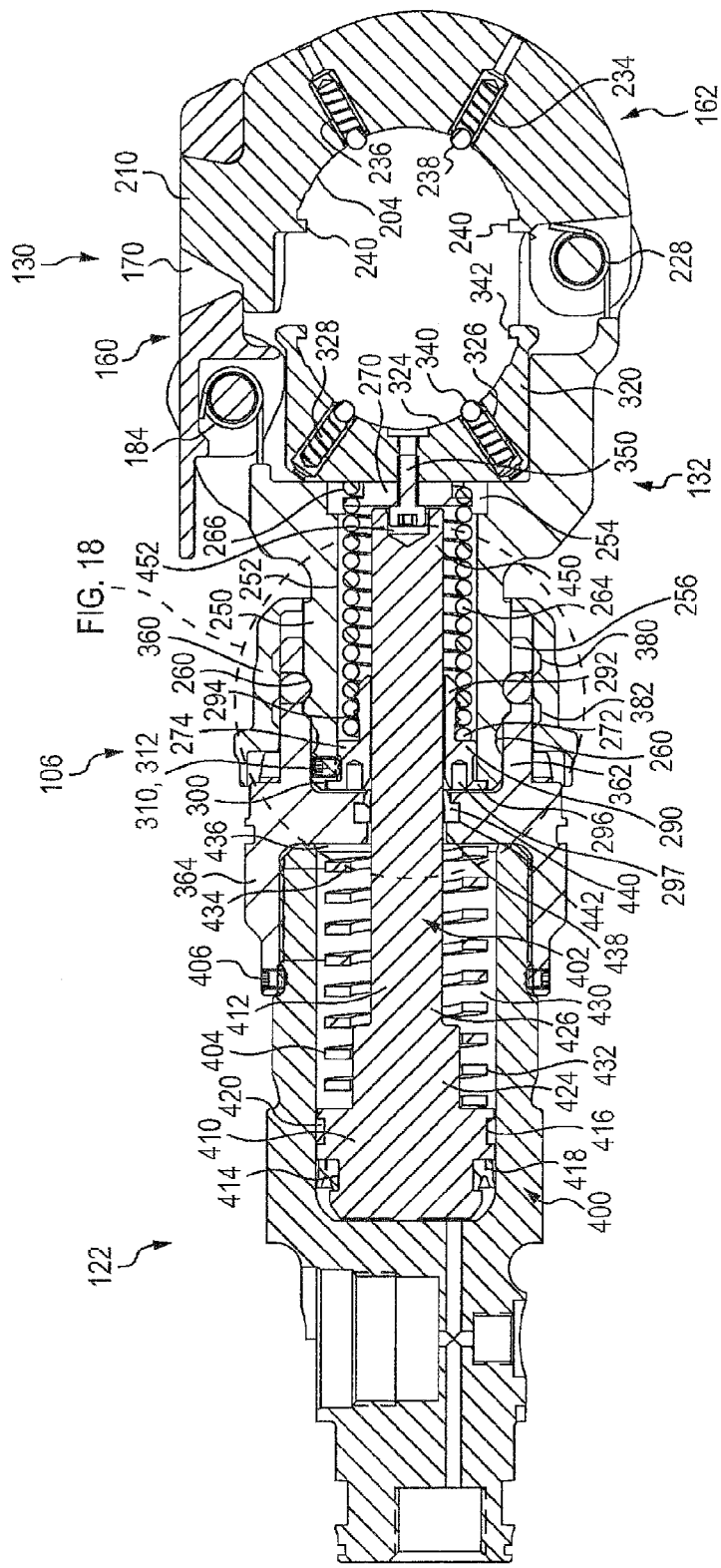
FIG. 5 is a cross-sectional view of the assembly of FIG. 3.

FIGS. 3-5 depict an interchangeable work head 130 for use with the work tool 100 according to one aspect of the present disclosure. The work head 130 includes a yoke 132 comprising a pair of spaced generally C-shaped arms 134, 136 interconnected by a base member 138. Upper or first end portions 140, 142 of the respective arms 134, 136 define a top yoke, and lower or second end portions 150, 152 of the respective arms 134, 136 define a bottom yoke. The present subject matter includes a wide array of components and assemblies for guiding movement of work head components such as movable die holders can be used instead of a yoke or yoke assembly. Thus for example, it will be understood that instead of yoke 132 (or other yokes as described herein), a variety of other guide assemblies or alignment assemblies could be used for the yoke. However, for ease in describing particular embodiments of the subject matter, the guide or alignment assemblies are generally depicted and described herein as yokes or yoke assemblies.

A latch 160 is pivotally connected to the upper yoke and an upper die holder 162 is pivotally connected to the bottom yoke. The latch 160 includes a body 164 having a bore 166 provided at one end portion 168 and a slot 170 provided at the other end portion 172. The body 164 can further include a finger tab 174 extending outwardly from end portion 168. As depicted, the latch 160 is connected to the top yoke via a pivot pin 180. The pin 180 is inserted through a pivot bore 182 provided on the first end portion 140 of arm 134, a biasing member or torsion spring 184, the bore 166 of the latch 160, and a pivot bore 186 provided on the first end portion 142 of arm 136. External retaining rings 190 are attached to the ends of the pivot pin 180.

The upper die holder 162 includes a C-shaped body 200 having an outer surface 202 and an inner surface 204. An upper or first end portion 206 of the body 200 includes a projection 210. The projection 210 is dimensioned to be received in the slot 170 of the latch 160. A lower or second end portion 214 of the body 200 includes a pivot bore 216. The second end portion 214 positions within the second end portions 150, 152 of the respective arms 134, 136 so that the pivot bore 216 is aligned with a pivot bore 220 provided on the second end portion 150 of arm 134 and a pivot bore 222 provided on the second end portion 152 of arm 136. As depicted, the upper die holder 162 is connected to the bottom yoke via a pivot pin 226. The pin 226 is inserted through the pivot bore 220, the bore 216 of the upper die holder 162, a biasing member or torsion spring 228, and the pivot bore 222. External retaining rings 230 are attached to the ends of the pivot pin 226. The upper die holder 162 is designed to hold a half round electric lug crimping die (not shown). Particularly, the inner surface 204 of the upper die holder 162 includes a pair of spaced holes 234. Detent or guide spring assemblies 236 are secured in the holes 234. In certain versions of the present subject matter, the detent or guide spring assemblies include an outer enclosure or cage, a compression spring, and a steel ball retained within the cage and biased to a designated position by the spring. Such assemblies are commercially available such as from Carr Lane Manufacturing of St. Louis, Mo. and are typically referred to as ball plungers or other spring loaded devices. The noted ball plungers are typically available in "press in" style or in "thread in" style. The present subject matter includes the use of these and other assemblies for use as detent or guide spring assemblies. In the particular version described and shown, each of the guide spring assemblies 236 includes a ball 238 which at least partially projects from the inner surface 204. Further provided on the inner surface 204 is a pair of spaced ledges 240. To secure the crimping die on the upper die holder 162, the crimping die is positioned between the ledges 240 so that the crimping die is engaged by the balls 238 provided on the spring assemblies 236.

With continued reference to FIGS. 4 and 5, the yoke 132 further includes a generally cylindrical member 250 extending outwardly from the base member 138 toward the quick release coupling 106. The cylindrical member 250 defines a bore 252 which is aligned with an opening 254 in the base member 138. Provided on an outer surface 256 of the cylindrical member 250 are circumferential tracks or grooves 260 that are selectively engaged by the quick release coupling 106, as will be described below. Housed in the bore 252 of the cylindrical member 250 is a biasing member or extension/tension type spring 264. The spring 264 includes a first end 266 secured to a spring retainer 270 and a second end 272 secured to a screw type locking mechanism or cap 274. As shown, the retainer 270 includes a body 276 having an enlarged radially extending or annular shelf 278 which is received in the opening 254 of the base member 138. The first end 266 of the spring 264 is mounted onto the shelf 278. The cap 274 is provided with a body 290 having a cylindrical protrusion 292 extending outwardly therefrom. The protrusion 292 includes a threaded portion 294, and a pitch of the thread substantially corresponds to the pitch of the undeformed tension spring 264. This allows the cap 274 to thread into the tension type spring 264. To secure the cap 274 to the cylindrical member 250, an annular flange 296 located on the body 290 opposite the protrusion 292 is dimensioned to be received in a corresponding annular groove 300 on an end face of the cylindrical member 250. A set screw 310 is threaded through an opening 312 on the cylindrical member 250 and engages the body 290 of the cap 274. One advantage of the set screw 310 is that it can be infinitely adjustable since it does not require a mating hole on the body 290 to align with the set screw.

The exemplary work head 130 further includes a moveable die holder 320 configured to be biased in an open position by the tension type spring 264. As depicted, the moveable die holder 320 includes a body 322 sized to be received between the arms 134, 136 of the yoke 132, and displaceable on a portion of the base member 138. Similar to the upper die holder 162, the moveable die holder 320 is designed to hold a half round electric lug crimping die (not shown). Dies for cutting cable, rebar, threaded rods and other components and pressing plumbing or other conduit fittings are also available. Particularly, the body 322 has a curved surface 324 which substantially corresponds in shape to (i.e., is a mirror image of) the inner surface 204 of the upper die holder 162. The surface 324 includes a pair of spaced holes 326 having mounted therein detent or guide spring assemblies 328. The guide spring assemblies 328 are similar to detent or guide spring assemblies 236, and include balls 340 which at least partially project from the outer surface 324. Further provided on the surface 324 is a pair of diametrically spaced ledges 342. To secure the crimping die on the moveable die holder 320, the crimping die is positioned between the ledges 342 so that the crimping die is engaged by the balls 340 provided on the guide spring assemblies 328.

As indicated above, the cylindrical member 250 houses the tension type spring 264, and the spring 264 is secured to the moveable die holder 320 via a fastener 350. The fastener 350 extends through an opening 352 in the retainer 270 and threadingly engages an opening in the body 322 of the moveable die holder 320. However, it should be appreciated that alternative manners for mounting the spring 264 to the moveable die holder 320 are contemplated. For example, and in lieu of the retainer 270, a cylindrical protrusion can extend from the moveable die holder 320. The protrusion can be shaped similar to protrusion 292 and can include a threaded portion that can be threaded into the tension type spring 264. To assemble the exemplary work head 130, the tension type spring 264 is attached to the moveable die holder 320 via the spring retainer 270 and the fastener 350. Next, the tension type spring 264 is inserted into the cylindrical member 250 of the yoke 132. The screw locking mechanism or cap 274 is then threaded into the spring 264. As the cap 274 is rotated, it will extend the spring 264 causing a preload force to be applied to the moveable die holder 320 which, in turn, will bias the moveable die holder 320 in the open position. To allow convenient rotation of cap 274, a series of holes 297 are provided which can receive pin protrusions of a spanner type wrench (not shown) and allow rotation of cap 274. Once the desired spring preload is attained, the cap 274 can be locked in place via the set screw 310 to prevent unintentional loosening of the mechanism. However, it should be appreciated that other types of screw locking mechanisms could be incorporated such as deforming a metal tang or a locking mechanism having an adhesive.

With reference back to FIGS. 3 and 5, the quick-connect or quick release coupling 106 includes a locking ring 360, a ball holding part 362 connected to a coupler 364, and a spring element 374. In the ball holding part 362, balls 366 with a first diameter and balls 368 with a second diameter are disposed in respective ball guides 370, 372 such that they are radially movable. The balls 366, 368 act as movable locking bodies and are distributed over the periphery of the ball holding part 362. The shape of the ball guides 370, 372 on the inside of the ball holding part 362 prevents the balls 366, 368 from falling out when the cylindrical member 250 of the work head 130 is not inserted or not inserted fully.

Furthermore, the ball holding part 362 has staggered internal radii, namely an area with a greater outside internal radius in the area of the ball guides 370 and the balls 366 and an area with a smaller inside internal radius in the area of the ball guides 372 and the other balls 368. As indicated above, the cylindrical member 250 of the yoke 132 is provided with the two circumferential grooves 260 that are selectively engaged by the quick-connect coupling 106. Accordingly, the cylindrical member 250 can have outside radii that are likewise staggered and adapted to the corresponding graduations (e.g., differing radii) in the ball holding part 362.

The locking ring 360 is mounted on the ball holding part 362 in an axially movable manner. The locking ring 360 has locating grooves 380, 382 on the inside, which are formed so that the balls 366, 368 can move away into the respective locating grooves 380, 382 when the locking ring 360 is in the unlocked position, and thereby avoid obstructing the insertion of the cylindrical member 250 of the work head 130. The spring element 374 is mounted between the ball holding part 362 and the locking ring 360 and permanently presses the locking ring 360 in an axial direction into the locking position. In order to achieve the unlocked position of the locking ring 360, the locking ring 360 must therefore be moved into this position manually by means of a gripping portion 388. To limit the axial movement of the locking ring 360 relative to the ball holding part 362, set screws 390 are threaded into openings 392 on the locking ring 360, and distal ends of the set screws 390 are received in axial slots 394 located on the ball holding part 362.

The work tool 100 includes the hydraulically actuated piston assembly 122 that is used to actuate the work head connected thereto. The assembly 122 generally comprises a hydraulic cylinder or main body 400, a ram piston 402 and a biasing member or compression type spring 404. The main body 400 can be connected to the coupler 364 via set screws 406 threaded though openings 408 in the coupler 364. Specifically, in a particular version of the present subject matter, the main body 400 is threaded onto the coupler 364. The threads can be provided along an upper end of the main body 400. The set screws 406 serve to secure or lock the threaded connection. The ram piston 402 includes a piston body 410 and an elongated member 412 extending outwardly from the piston body 410. The piston body 410 defines a first circumferential groove 414 and a second circumferential groove 416. The first groove 414 is sized to receive a first hydraulic seal 418 and the second groove is sized to receive a hydraulic guide ring 420. A cylindrical, hollow projection 424 extends from the piston body 410 and receives a first end portion 426 of the elongated member 412. The piston body 410 is sealingly received in a cylindrical-shaped hydraulic cavity 430 of the main body 400 which is open in the direction of the work head 130. It should be appreciated that the inner wall of the cavity 430 serves to guide the movement of the piston body 410, and the elongated member 412, during operation of the work tool 100, and the seal 418 provides a seal relative to the inner wall of the hydraulic cavity 430. One end 432 of the compression type spring 404 is supported on the projection 424. An opposite end 434 of the spring 404 engages an internal wall 436 of the coupler 364. As a result, the ram piston 402 is always spring-loaded or biased away from the work head 130.

The elongated member 412 of the ram piston 402 is formed as one-piece and extends through the spring 404 and an opening 438 in the internal wall 436 and outwardly a predetermined distance beyond the quick-connect coupling 106. It should be recognized that it may be advantageous to make the piston 410 as a two piece arrangement where the elongated member 412 is made of a different material than the piston. To ensure proper alignment of the elongated member 412 through the quick-connect coupling 106, a guide ring 440 can be provided in an internal groove 442 located on a surface of the internal wall 436 that defines the opening 438. The guide ring 440 can be formed from an elastomeric material which allows the guide ring to act as a wiper for removing any contaminants from the elongated member 412 when the ram piston 402 is retracted. This serves to protect the ram piston seals 418, 420 from damage from contaminants that could result in a hydraulic leak.

With reference to FIG. 5, to connect the work head 130 to piston assembly 122 of the work tool 100 via the quick-connect coupling 106, the cylindrical member 250 of the work head 130 is inserted into the quick-connect coupling 106. The interchangeable work head defines a recessed receiving region for receipt of a distal end of the ram piston, which extends outward and beyond the quick release coupling of the work tool. A free second end portion 450 of the elongated member 412 of the ram piston 402 is inserted through the cap 274 secured to the cylindrical member 250 and the tension type spring 264. Again, the cap is used to support the tension type spring 264 and as a centering means for centering the elongated member 412 in the cylindrical member 250. An end face of the second end portion 450 is provided with a hole 452 dimensioned to receive a head of the fastener 350 extending through the retainer 270 and secured to the moveable die holder 320. This allows the second end portion 450 of the elongated member 412 to abut the body 276 of the retainer 270.

When the hand-held work tool 100 is actuated, oil or other hydraulic fluid or working fluid is pumped into a pressure space, the ram piston 402 thereby being moved in the direction of the work head 130 counter to the action of the compression type spring 404. This, in turn, moves the moveable die holder 320 of the work head 130 counter to the action of the tension type spring 264. The return motion of the ram piston 402 is accomplished by means of the tension type spring 264, which acts on the moveable die holder 320, and by the compression type spring 404, which acts on the piston body 410 via the centering projection 424 as soon as a non-return valve opens when a predetermined maximum pressure is exceeded. The work tool 100 allows the user to interchange the work head 130 in a simple, modular manner. By virtue of this configuration, the hand-held work tool 100 can also be preassembled, filled with oil and checked, after which a suitable work head 130 can be mounted if required.

Figure 18:
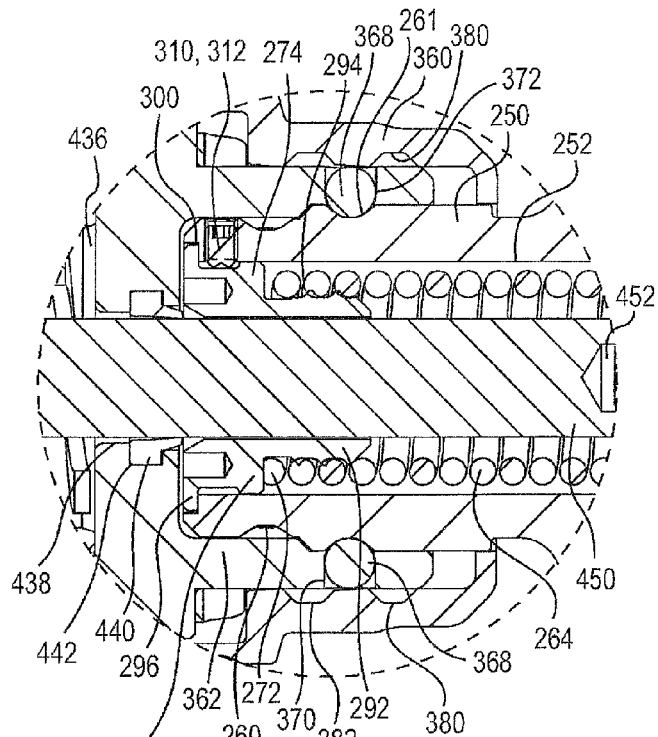
FIG. 18 is a detailed view of a region of FIG. 5.

Additional details of the quick-connect coupling 106 are provided herein in conjunction with description of FIG. 18.

Figure 6:
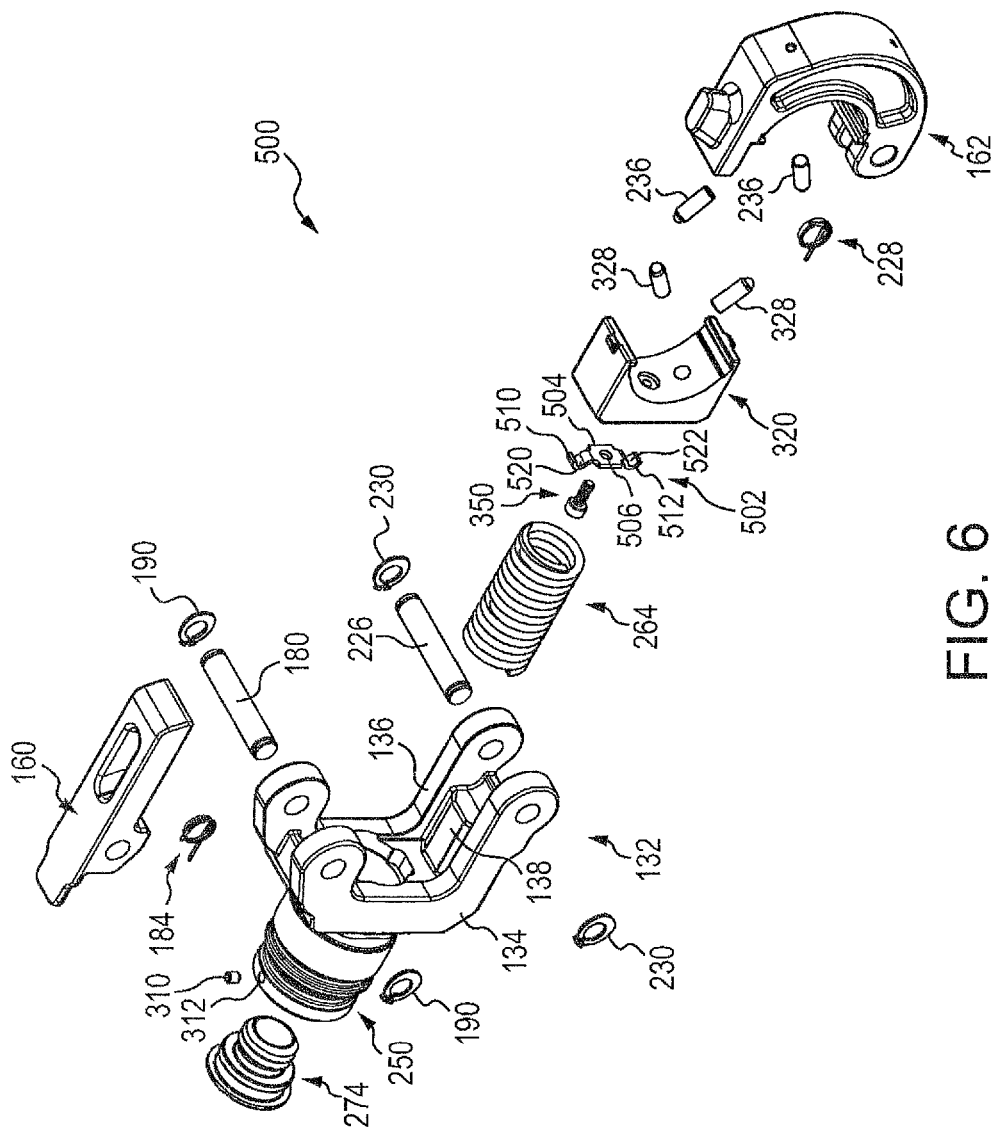
FIG. 6 is an exploded view of an exemplary work head for the work tool of FIG. 1 according to another aspect of the present disclosure.

FIG. 6 depicts an interchangeable work head 500 for the work tool 100 according to another aspect of the present disclosure. Similar to work head 130, work head 500 includes the yoke 132 comprising the pair of spaced arms 134, 136 interconnected by the base member 138. The latch 160 is pivotally connected to the yoke 132 via the pivot pin 180 which is inserted through the torsion spring 184 and retained by the retaining rings 190. The upper die holder 162 is pivotally connected to the yoke 132 via the pivot pin 226 which is inserted through the torsion spring 228 and retained by the retaining rings 230. The upper die holder 162 includes the detent or guide spring assemblies 236.

The yoke 132 further includes the generally cylindrical member 250 which is selectively connected to the quick release coupling 106 (see FIG. 5). Housed in the cylindrical member 250 is the biasing member or tension type spring 264. The spring 264 is secured to the screw type locking mechanism or cap 274 and a spring retainer 502. The spring retainer 502 includes a base 504 having an opening 506. A first arm 510 extends outwardly from one edge of the base 504 and a second arm 512 extends outwardly from an opposite edge of the base 504. Each of the first and second arms 510, 512 have a respective curved section 520, 522 adapted to engage the coil of the spring 264. The tension type spring 264 is mounted to the moveable die holder 320 via the fastener 350 which extends through the opening 506 of the retainer 502. The moveable die holder 320 is biased in an open position by the tension type spring 264 and includes the detent or guide spring assemblies 328.

To assemble the exemplary work head 500, the tension type spring 264 is attached to the moveable die holder 320 via the spring retainer 502 and the axially arranged fastener 350. Next, the tension type spring 264 is inserted into the cylindrical member 250 of the yoke 132. The screw locking mechanism or cap 274 is then threaded into the tension type spring 264. Once the desired spring preload is attained, the cap 274 can be locked in place via the set screw 310 and threaded aperture 312 to prevent unintentional loosening of the mechanism.

Figure 7:
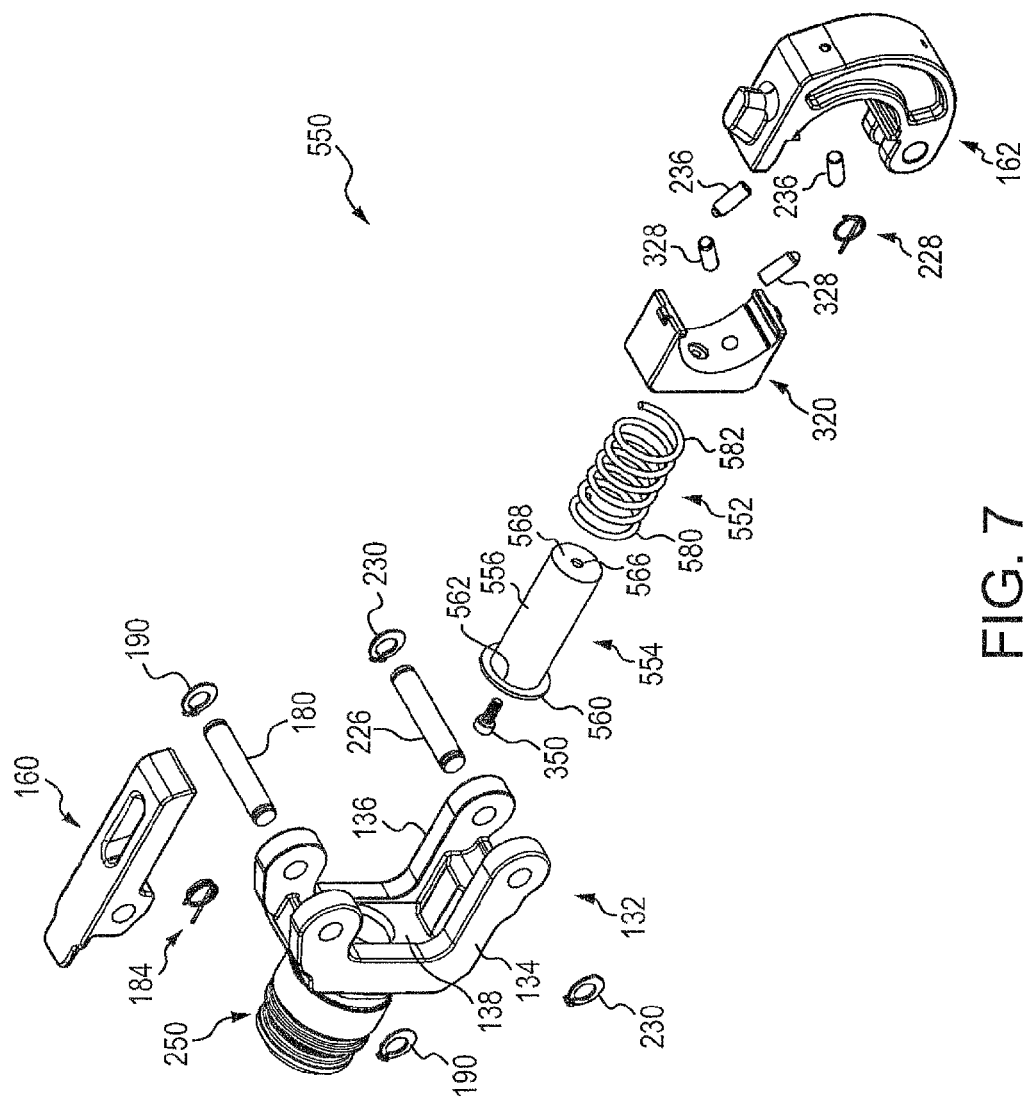
FIG. 7 is an exploded view of an exemplary work head for the work tool of FIG. 1 according to yet another aspect of the present disclosure.
Figure 8:
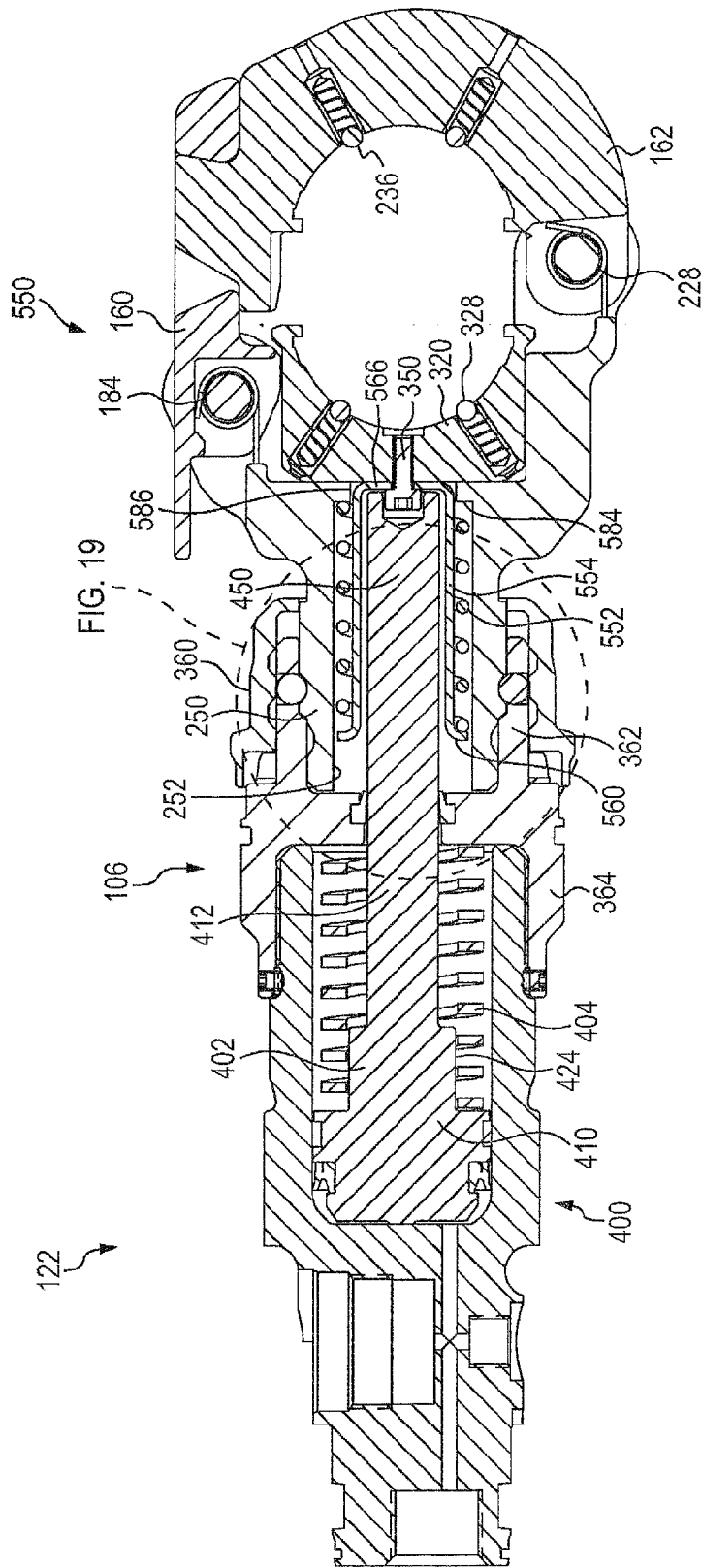
FIG. 8 is a cross-sectional view of the work head of FIG. 7 connected to the hydraulically actuated piston assembly and quick-connect coupling of FIG. 1.

FIGS. 7 and 8 depict an interchangeable work head 550 for the work tool 100 according to yet another aspect of the present disclosure. Similar to the work heads described above, work head 550 includes the yoke 132 comprising the pair of spaced arms 134, 136 interconnected by the base member 138. The latch 160 is pivotally connected to the yoke 132 via the pivot pin 180 which is inserted through the torsion spring 184 and retained by the retaining rings 190. The upper die holder 162 is pivotally connected to the yoke 132 via the pivot pin 226 which is inserted through the torsion spring 228 and retained by the retaining rings 230. The upper die holder 162 includes the detent or guide spring assemblies 236.

The yoke 132 further includes the generally cylindrical member 250 which is selectively connected to the quick release coupling 106. Housed in the cylindrical member 250 is a biasing member or compression type spring 552. The spring 552 is mounted on a cup-shaped sleeve or retainer 554. The retainer includes a cylindrical body 556 having a radial flange 560 at an open end 562 of the body and an axial through hole 566 at a generally closed end 568 of the body 556. With the retainer 554 inserted through the compression type spring 552, the flange 560 serves as a stop for one end 580 of the spring 552. The other end 582 of the spring 552 is supported against an internal wall or step 584 of the bore 252 of the cylindrical member 250. The generally closed end 568 of the retainer body 556 is sized to pass at least partially through an opening 586 defined by the step 584. The retainer 554 is mounted to the moveable die holder 320 via the fastener 350 which extends through the opening 566 of the retainer 554. The moveable die holder 320 is spring-loaded or biased in an open position by the compression type spring 552 and includes the detent pins 328.

When the hand-held work tool 100 is actuated, oil or other hydraulic fluid or working fluid is pumped into a pressure space of the main body 400 of piston assembly 122, the ram piston 402 thereby being moved in the direction of the work head 550 counter to the action of the compression type spring 404. The end portion 450 of elongated member 412 of the ram piston body 410, which is received in the retainer 554, engages the generally closed end 568 of the retainer body 556. This, in turn, moves the retainer 554 through the opening 586 and moves the moveable die holder 320 of the work head 550. This movement compresses the spring 552. The return motion of the ram piston 402 is accomplished by means of the compression type spring 552, which acts on the retainer 554 and moveable die holder 320, and by the compression type spring 404, which acts on the piston body 410 via the centering projection 424 as soon as a non-return valve opens when a predetermined maximum pressure is exceeded.

The springs 264 and 552 in previously described work heads 130, 500, and 550 are examples of biasing provisions disposed in a bore of a yoke assembly. It will be understood that the present disclosure includes other types of biasing provisions.

Figure 19:
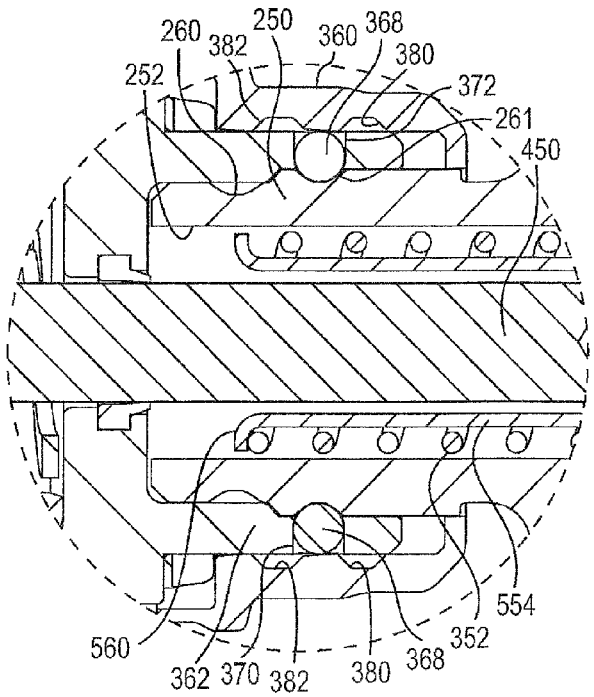
FIG. 19 is a detailed view of a region of FIG. 8.

Additional details of the quick-connect coupling 106 are provided herein in conjunction with description of FIG. 19.

Figure 9:
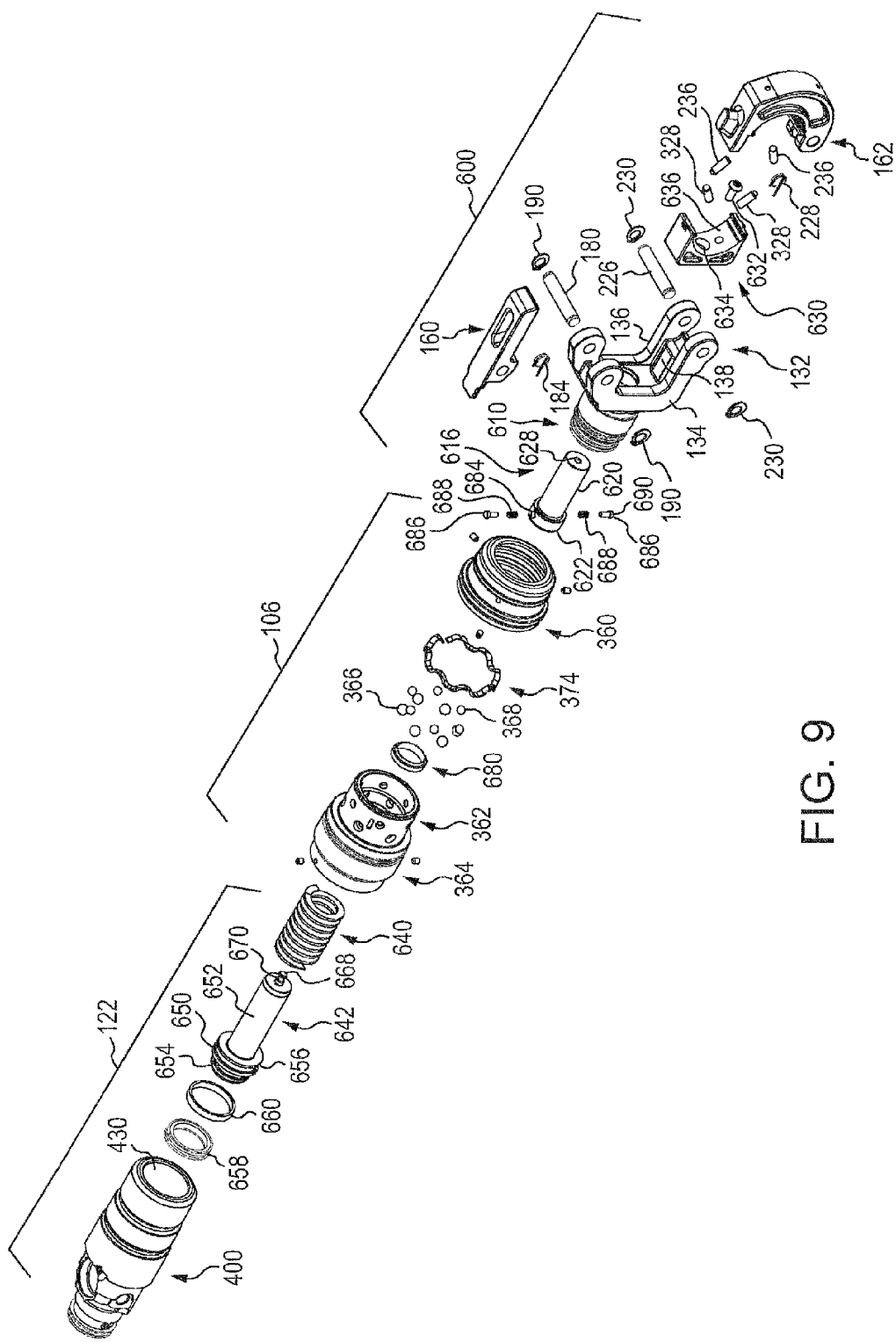
FIG. 9 is an exploded view of the hydraulically actuated piston assembly and quick-connect coupling of the work tool of FIG. 1 and an exemplary work head for the work tool of FIG. 1 according to still yet another aspect of the present disclosure.
Figure 10:
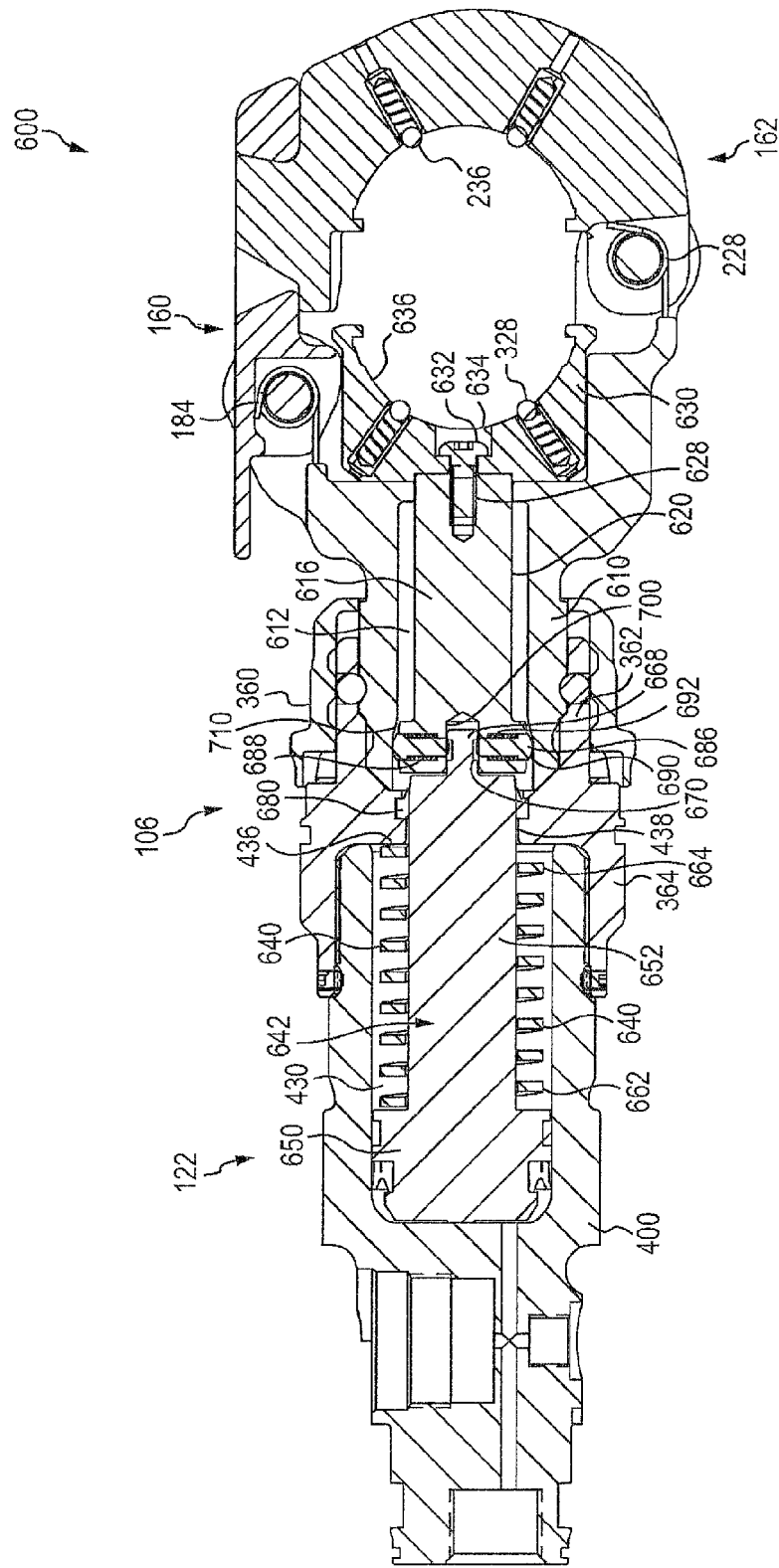
FIG. 10 is a cross-sectional view of the assembly of FIG. 9.

FIGS. 9 and 10 depict an interchangeable work head 600 for the work tool 100 according to still yet another aspect of the present disclosure. Similar to the work heads described above, work head 600 includes the yoke 132 comprising the pair of spaced arms 134, 136 interconnected by the base member 138. The latch 160 is pivotally connected to the yoke 132 via the pivot pin 180 which is inserted through the torsion spring 184 and retained by the retaining rings 190. The upper die holder 162 is pivotally connected to the yoke 132 via the pivot pin 226 which is inserted through the torsion spring 228 and retained by the retaining rings 230. The upper die holder 162 includes the detent or guide spring assemblies 236.

The yoke 132 further includes a generally cylindrical member 610 which is selectively connected to the quick release coupling 106. Housed in a bore 612 defined by the cylindrical member 610 is a slidable member or piston 616. The piston 616 includes a cylindrical body 620 having an annular flange 622 at one end of the body 620 and an axial threaded opening 628 at the other end of the body 620. The piston 616 is mounted to a moveable die holder 630 via a fastener 632. The fastener 632 extends through an opening 634 in a surface 636 of the moveable die holder 630 and threadingly engages the opening 628 of the piston 616. The moveable die holder 630 is spring-loaded or biased in an open position by a biasing member or compression type spring 640 of the hydraulically actuated piston assembly 122 and includes the detent or guide spring assemblies 328.

The hydraulically actuated piston assembly 122, that is used to actuate the work head 600 connected thereto, generally comprises the hydraulic main body 400, a ram piston 642 and the compression type spring 640. The ram piston 642 includes a piston body 650 and an elongated member 652 extending outwardly from the body. The piston body 650 defines a first circumferential groove 654 and a second circumferential groove 656. The first groove 654 is sized to receive a first hydraulic seal 658 and the second groove 656 is sized to receive a hydraulic guide ring 660. The piston body 650 is sealingly received in the cylindrical-shaped hydraulic cavity 430 of the main body 400. One end 662 of the compression type spring 640 abuts the body 650. An opposite end 664 of the spring 640 engages the internal wall 436 of the coupler 364. As a result, the ram piston 642 is always spring-loaded or biased away from the work head 600.

The elongated member 652 of the ram piston 642 extends through the spring 640 and the opening 438 in the internal wall 436. A distal end of the elongated member 652 includes an axial projection 668 having a circumferential groove 670 defined therein. To ensure proper alignment of the elongated member 652 through the quick-connect coupling 106, a guide ring 680 can be mounted in the opening 438 of the internal wall 436. Similar to the guide ring 440 (FIG. 5), guide ring 680 can be formed from an elastomeric material which allows the guide ring 680 to act as a wiper for removing any contaminants from the elongated member 652 when the ram piston 642 is retracted.

To connect the work head 600 to the work tool 100 via the quick-connect coupling 106, the cylindrical member 610 of the work head 600 is inserted into the quick-connect coupling 106. Located on the flange 622 of the piston 616 is a pair of diametrically spaced bores 684. Positioned in each bore 684 is a pin 686 which is biased outwardly from the flange 622 via a biasing member or compression type spring 688. Each pin 686 includes a head 690, the pin being inserted through the spring 688 so that one end of the spring abuts the head 690 and the other end of the spring abuts a ledge 692 provided in the bore 684. Each of the bores 684 are in communication with an axial bore 700 of the piston 616, and a radial force applied to the pins 686 causes a distal end of the pins to at least partially project into the axial bore 700. The axial bore 700 is dimensioned to receive the axial projection 668 located on the distal end of the elongated member 652. The assembly 686, 688 is an example of a radially outwardly biased engagement provision.

When the hand-held work tool 100 is actuated, oil is pumped into a pressure space, the ram piston 642 thereby being moved in the direction of the work head 600 counter to the action of the compression type spring 640. This, in turn, moves the piston 616 and the moveable die holder 630 of the work head 600. As the piston 616 advances, the heads 690 of the pins 686 move along a cam surface 710 provided in the cylindrical member 610. The engagement between the pins 686 and the cam surface 710 imparts a radial force to the pins 686 causing the pins 686 to move through the bores 684 and at least partially into the axial bore 700 of the piston 616. The distal ends of the pins 686 are then received in the circumferential groove 670 of the axial projection 668 located in the bore 700. This, in turn, mechanically engages or couples the piston 616 to the ram piston 642. The return motion of the piston 616 and the ram piston 642 is accomplished by means of the compression type spring 640, which acts on the piston body 650 as soon as a non-return valve opens when a predetermined maximum pressure is exceeded. As the piston 616 returns, the pins 686 move back on the cam surface 710 which, in turn, causes the pins 686 to disengage from the projection 688 and bias outwardly from the flange 622. This radial movement of the pins 686 disengages or decouples the piston 616 from the ram piston 642.

FIGS. 11-15 depict an interchangeable work head 800 for the work tool 100 according to still yet another aspect of the present disclosure. Similar to the work heads described above, work head 800 includes the yoke 132 comprising the pair of spaced arms 134, 136 interconnected by the base member 138. The latch 160 is pivotally connected to the yoke 132 via the pivot pin 180 which is inserted through the torsion spring 184 and retained by the retaining rings 190. The upper die holder 162 is pivotally connected to the yoke 132 via the pivot pin 226 which is inserted through the torsion spring 228 and retained by the retaining rings 230. The upper die holder 162 includes the detent or guide spring assemblies 236.

The yoke 132 further includes a generally cylindrical member 810 which is selectively connected to the quick release coupling 106. Housed in a bore 812 defined by the cylindrical member 810 is a slidable member or piston 816. The piston 816 includes a cylindrical body 820 having an annular flange or region 822 at one end of the body 820 and an axial threaded opening 828 at the other end of the body 820. The piston 816 is mounted to a moveable die holder 830 via a fastener 832. The fastener 832 extends through an opening 834 in a surface 836 of the moveable die holder 830 and threadingly engages the opening 828 of the piston 816. The moveable die holder 830 is spring-loaded or biased in an open position by a biasing member or compression type spring 840 of the hydraulically actuated piston assembly 122 and includes the spring assemblies 328.

Referring further to FIGS. 11-15, the hydraulically actuated piston assembly 122, that is used to actuate the work head 800 connected thereto, generally comprises the hydraulic main body 400, a ram piston 842 and the compression type spring 840. The ram piston 842 includes a piston body 850 and an elongated member 852 extending outwardly from the body. The piston body 850 defines a first circumferential groove 854 and a second circumferential groove 856. The first groove 854 is sized to receive a first hydraulic seal 858 and the second groove 856 is sized to receive a hydraulic guide ring 860. The piston body 850 is sealingly received in the cylindrical-shaped hydraulic cavity 430 of the main body 400. One end 862 of the compression type spring 840 abuts the body 850. An opposite end 864 of the spring 840 engages the internal wall 436 of the coupler 364. As a result, the ram piston 842 is always spring-loaded or biased away from the work head 800.

The elongated member 852 of the ram piston 842 extends through the spring 840 and the opening 438 in the internal wall 436. A distal end of the elongated member 852 includes an axial recess 868 having a circumferential groove 870 defined therein. To ensure proper alignment of the elongated member 852 through the quick-connect coupling 106, a guide ring 880 can be mounted in the opening 438 of the internal wall 436. Similar to the guide ring 440 (FIG. 5), guide ring 880 can be formed from an elastomeric material which allows the guide ring 880 to act as a wiper for removing any contaminants from the elongated member 852 when the ram piston 842 is retracted.

Figure 13:
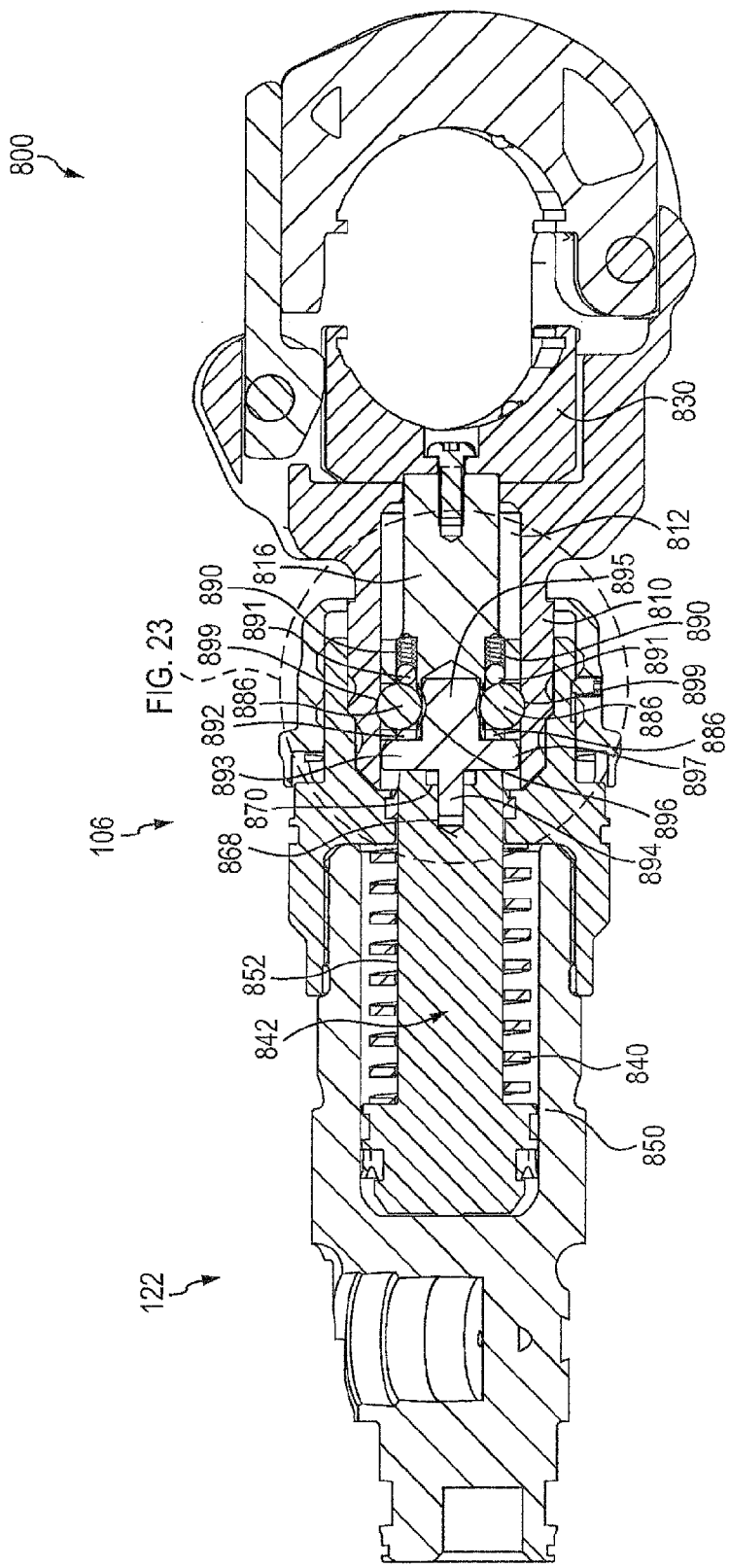
FIG. 13 is a cross-sectional view of the work ahead shown in FIGS. 11 and 12, taken across section plane 13-13 shown in FIG. 11.
Figure 14:
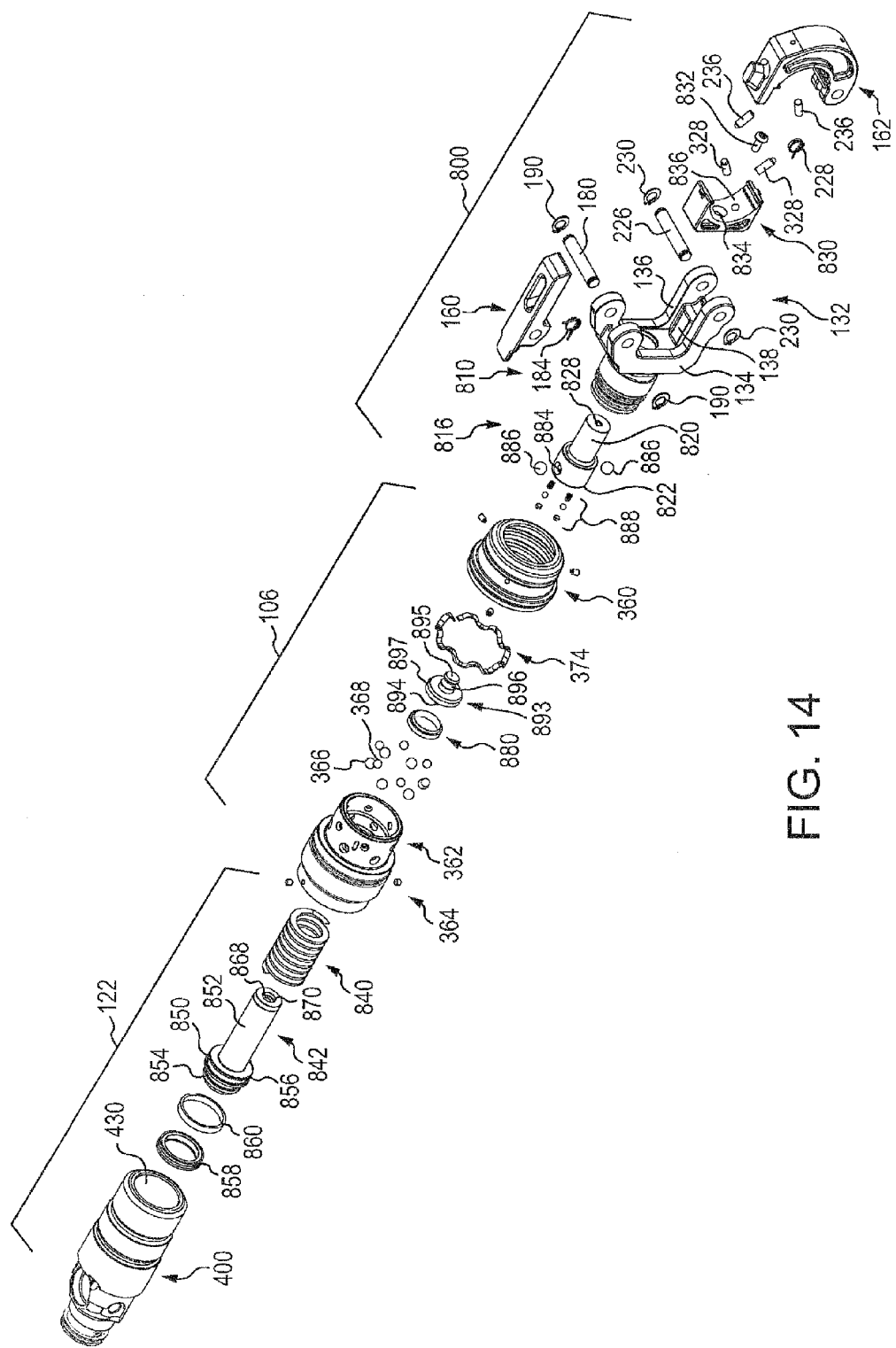
FIG. 14 is an exploded view of a portion of the hydraulically actuated piston assembly and quick-connect coupling of the work tool and the exemplary work head shown in FIGS. 11-13.
Figure 15:
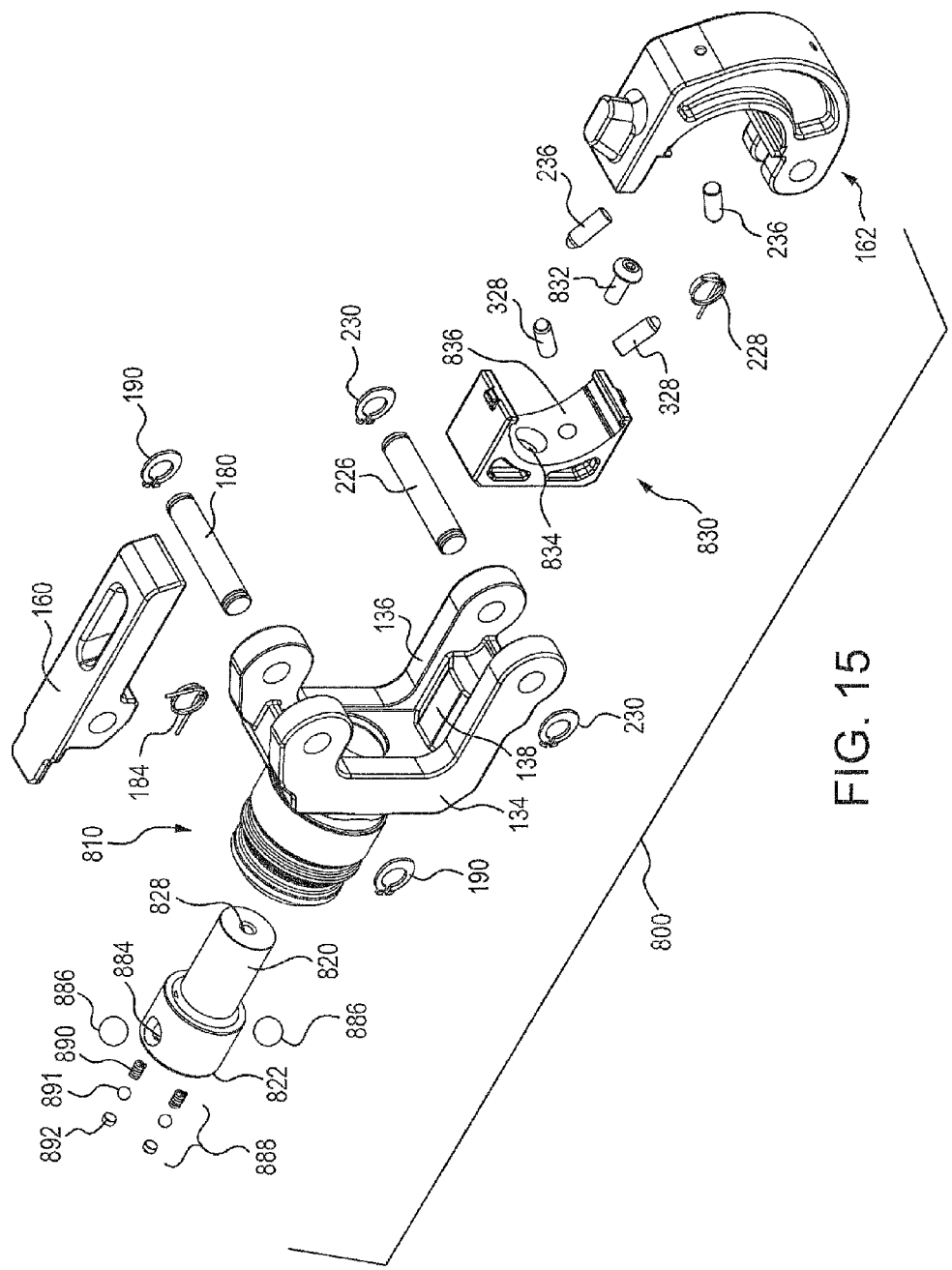
FIG. 15 is an enlarged exploded view of the work head of FIG. 14.

Referring further to FIGS. 11-15, to connect the work head 800 to the work tool 100 via the quick-connect coupling 106, the cylindrical member 810 of the work head 800 is inserted into the quick-connect coupling 106. Located on the flange 822 of the piston 816 is a pair of diametrically spaced bores 884. Positioned in each bore 884 (FIG. 11) is a ball 886 which is biased outwardly from the flange 822 via a biasing assembly 888 (FIG. 14). Although the present subject matter includes a wide array of configurations, components, and assemblies for the biasing assembly 888, in the particular version shown in the referenced figures, the biasing assembly 888 includes a spring 890 and a ball 891 which is urged into contact with the balls 886 to thereby urge each of the balls 886 radially outward from the piston 816. The longitudinal axis of the biasing assembly 888, i.e., the movement vector of ball 891, is oriented to intersect a region of a corresponding ball 886 which is located within an inwardly facing hemisphere of the ball 886. Thus, upon contact between the balls 891 and 886, the location of such contact on the ball 886 is such so as to urge displacement of the ball 886 radially outward. Hole plugs 892 (FIG. 13) fill the holes in piston 816 after insertion of ball 891 and spring 890. The assembly 886, 888 is an example of a radially outwardly biased engagement provision. A coupler 893 is positioned between the distal end of the elongated member 852 of the ram piston 842 and the piston 816. Specifically, the coupler 893 includes a projection 894 sized and configured to extend into the recess 868 defined in the elongated member 852 and an oppositely directed projection 895 sized and configured to extend into a corresponding axial recess defined in the piston 816. The coupler 893 also includes a radial member 897 sized and configured to engagingly fit within the bore 812 defined in the cylindrical member 810. The coupler 893 additionally defines a receiving groove 896 described in greater detail herein. Additional details of this embodiment are provided herein in the description of FIG. 23.

Figure 23:
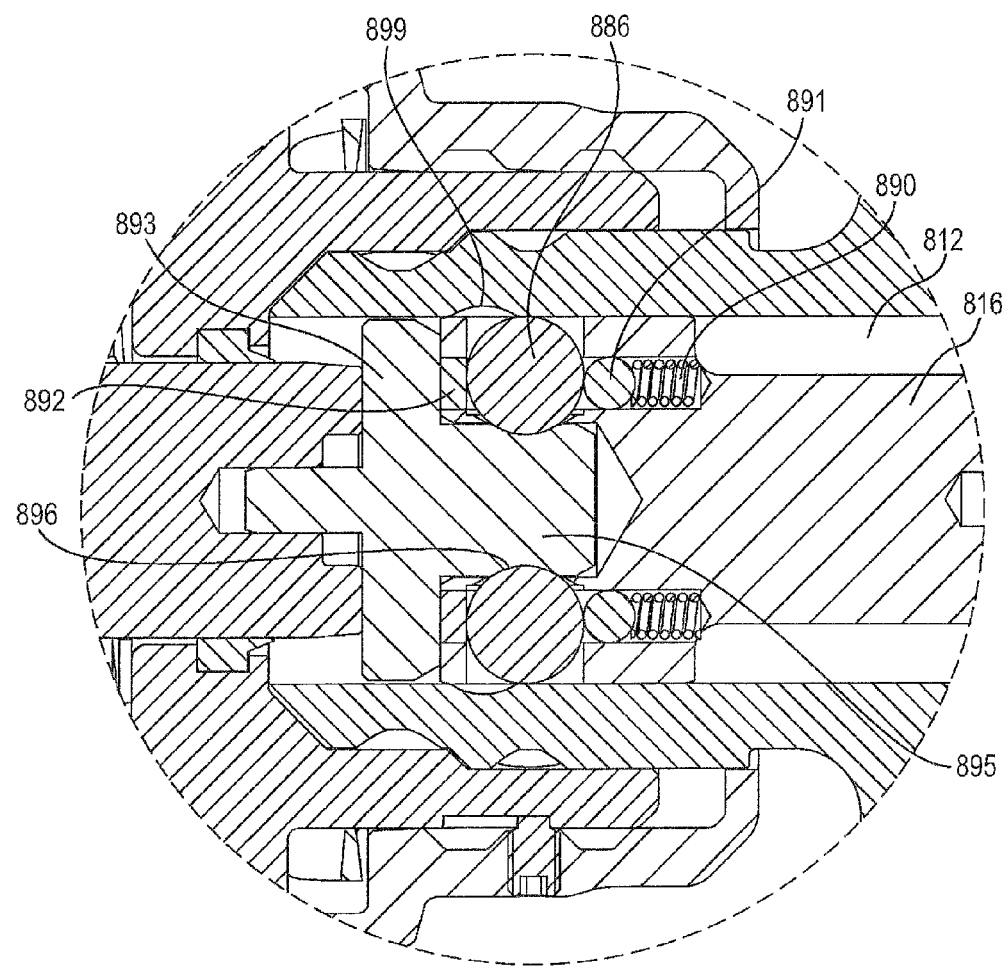
FIG. 23 is a detailed view of a region in FIG. 13 shown with the piston partially advanced.

When the hand-held work tool 100 is actuated, oil is pumped into a pressure space, the ram piston 842 thereby being moved in the direction of the work head 800 counter to the action of the compression type spring 840. This, in turn, moves the piston 816 and the moveable die holder 830 of the work head 800. As seen in FIG. 23, when the piston 816 advances, the ball detents 886 move along the bore 812 and remain at least partially disposed in the receiving groove 896 of the coupler 893 thereby coupling together the piston 816 and the ram piston 842. The return motion of the piston 816 and the ram piston 842 is accomplished by means of the compression type spring 840, which acts on the piston body 850 as soon as a non-return valve opens when a predetermined maximum pressure is exceeded. As the piston 816 returns, the ball detents 886 are received in the receiving groove 899 which, in turn, causes the ball detents 886 to disengage from the coupler 893 and bias outwardly from the flange 822 as illustrated in FIG. 13. This radial movement of the ball detents 886 disengages or decouples the piston 816 from the ram piston 842.

Figure 16:
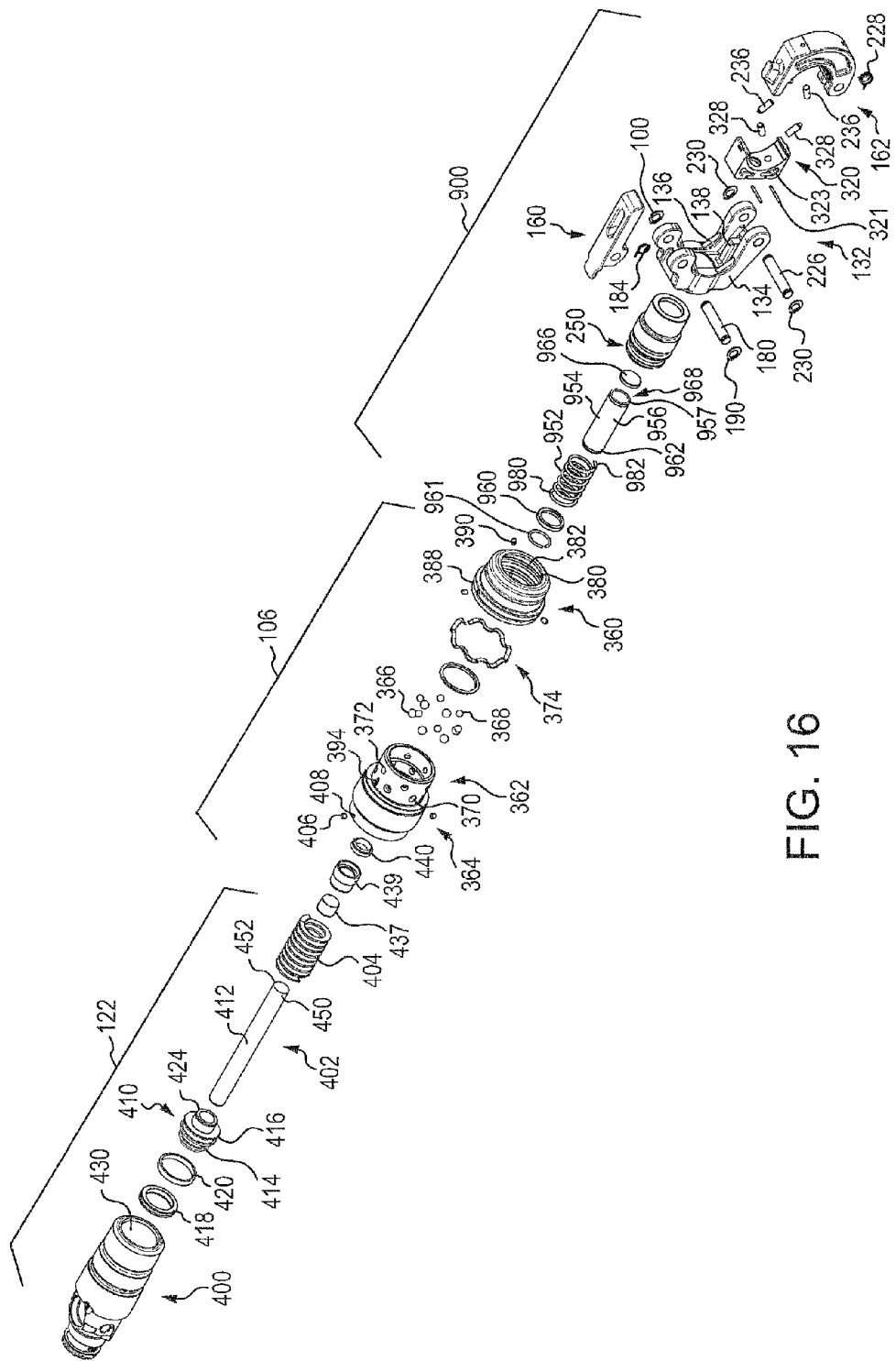
FIG. 16 is an exploded view of the hydraulically actuated piston assembly and quick-connect coupling of the work tool of FIG. 1 and an exemplary work head for the work tool of FIG. 1 according to still another aspect of the present disclosure.
Figure 17:
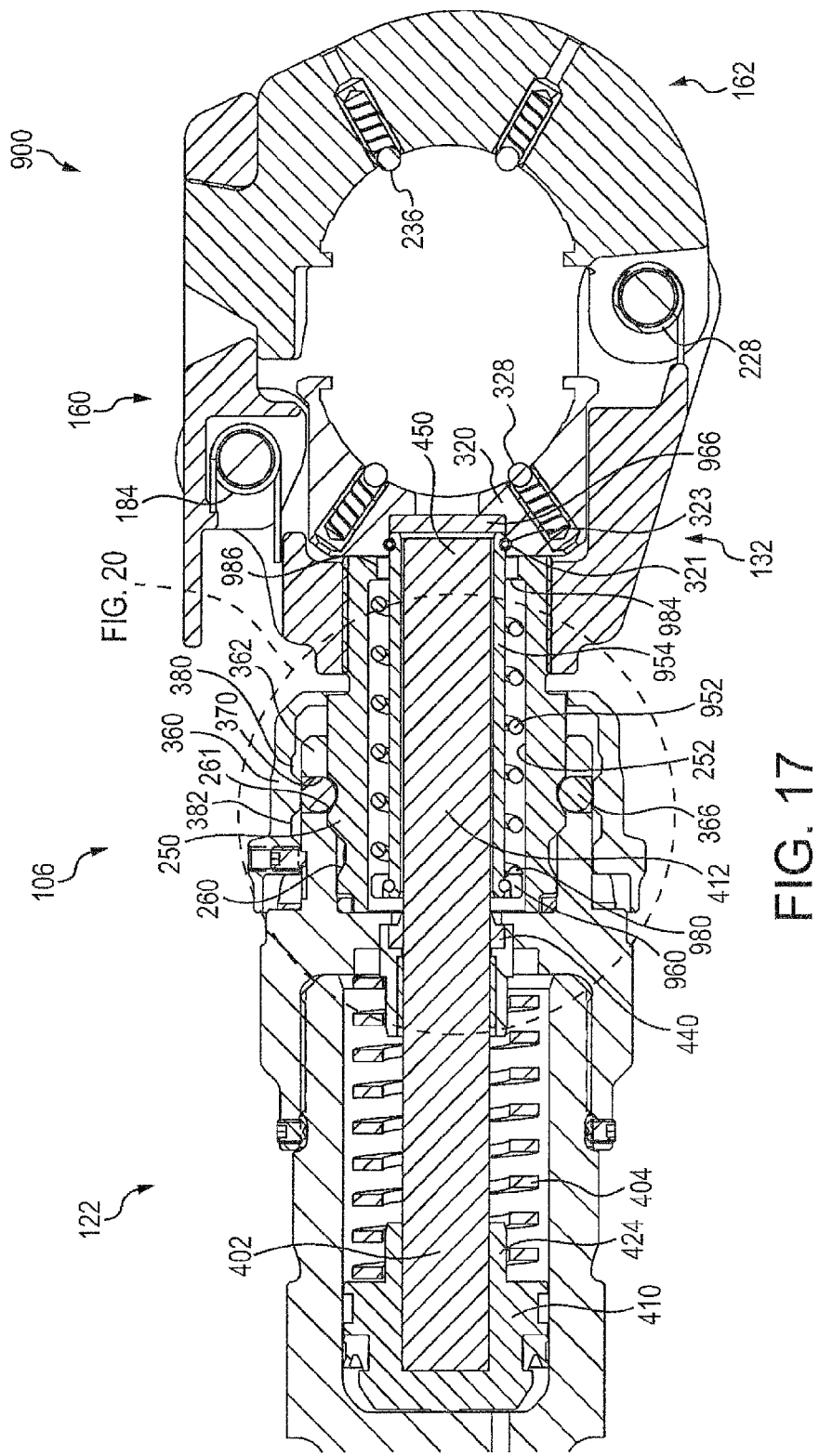
FIG. 17 is a cross-sectional view of the assembly of FIG. 16.

FIGS. 16 and 17 depict an interchangeable work head 900 for the work tool 100 according to yet another aspect of the present disclosure. Similar to the work heads described above, work head 900 includes the yoke 132 comprising the pair of spaced arms 134, 136 interconnected by the base member 138. The latch 160 is pivotally connected to the yoke 132 via the pivot pin 180 which is inserted through the torsion spring 184 and retained by the retaining rings 190. The upper die holder 162 is pivotally connected to the yoke 132 via the pivot pin 226 which is inserted through the torsion spring 228 and retained by the retaining rings 230. The upper die holder 162 includes the detent or guide spring assemblies 236.

The yoke 132 further includes the generally cylindrical member 250 which is selectively connected to the quick release coupling 106. Housed in the cylindrical member 250 is a biasing member or compression type spring 952. The spring 952 is disposed on a sleeve or retainer 954. The retainer includes a cylindrical body 956 having a seating ring 960 at an open end 962 of the body 956 and a plate 966 to form a generally closed end 968 of the body 956. With the retainer 954 inserted through the compression type spring 952, the seating ring 960 serves as a stop for one end 980 of the spring 952. A circular clip 961 is received in a groove defined at the end 962 of the retainer 954, and retains the seating ring 960 onto the retainer 954. The circular clip 961 prevents the seating ring 960 from removal or separation from the retainer 954. The other end 982 of the spring 952 is supported against an internal wall or step 984 of the bore 252 of the cylindrical member 250. The generally closed end 968 of the retainer body 956 is sized to pass at least partially through an opening 986 defined by the step 984. The retainer 954 is mounted to the moveable die holder 320 and spring pins 321 pass through holes 323 in moveable die holder 320 and engage in groove 957 in end 968 of body 956. The moveable die holder 320 is spring-loaded or biased in an open position by the compression type spring 952 and includes the detent pins 328.

The work tool 100 includes the hydraulically actuated piston assembly 122 that is used to actuate the work head connected thereto. The assembly 122 shown in FIG. 16 is as previously described in conjunction with FIG. 3. A guide ring 440 is used to ensure proper alignment and provide a wiping function as also described in conjunction with FIG. 3. Associated retainer 439 and sleeve member 437 can be used for mounting the guide ring 440. The components of the quick-connect coupling 106 are described in conjunction with FIG. 3. And additional details of the quick-connect coupling 106 are described in association with FIG. 20.

When the hand-held work tool 100 is actuated, oil or other hydraulic fluid or working fluid is pumped into a pressure space, the ram piston 402 and its piston body 410 and elongated member 412 thereby being moved in the direction of the work head 900 counter to the action of the compression type spring 404. The end portion 450 of elongated member 412 of the ram piston, which is received in the retainer 954, engages the generally closed end 968 of the retainer body 956 by pressing against plate 966. This, in turn, moves the retainer 954 through the opening 986 and moves the moveable die holder 320 of the work head 900. This movement compresses the spring 952. The return motion of the ram piston 402 is accomplished by means of the compression type spring 952, which acts on the retainer 954 via seating ring 960 and circular clip 961 and moveable die holder 320, and by the compression type spring 404, which acts on the piston body 410 via the centering projection 424 as soon as a non-return valve opens when a predetermined maximum pressure is exceeded.

FIGS. 18, 19, 20, and 23 are detailed views of regions shown in FIGS. 5, 8, 17, and 13, respectively. FIGS. 18, 19, 20, and 23 illustrate in greater detail particular aspects of releasable engagement assemblies used in certain quick-connect couplings such as coupling 106, in accordance with the present subject matter. Specifically, the releasable engagement assemblies comprise a particular configuration of components, a plurality of balls having a first diameter, and a plurality of balls having a second diameter. In many versions of the present subject matter, the second diameter is greater than the first diameter. For example, as shown in FIG. 16, the plurality of balls 366 have a diameter that is greater than the diameter of the plurality of balls 368.

The particular configuration of components of the releasable engagement assemblies includes an outer locking ring such as locking ring 360 which provides a generally circumferential inner face defining at least one locating groove, and particularly a first circumferential locating groove and a second circumferential locating groove spaced from the first locating groove. Each of the first and the second locating grooves is accessible along the inner face of the locking ring. Representative examples of such locating grooves include locating grooves 380 and 382 of the locking ring 360. In certain versions of the present subject matter, the shape and size of the locating grooves are such so as to fittingly receive the plurality of balls. For example, the shape and size of the locating groove closer to the pressing device, e.g., locating groove 382, is shaped and sized to fittingly receive the plurality of balls 366 (see FIG. 3 for example, since not shown in FIGS. 18-20). And, the shape and size of the locating groove closer to the work head, e.g., locating groove 380, is shaped and sized to fittingly receive the plurality of balls 368. As described in greater detail herein, the outer locking ring is axially positionable with respect to a ball holding part such as 362 shown in FIGS. 3 and 16.

The configuration of components also includes an inner cylindrical component which is a cylindrical member of the yoke, such as the cylindrical member 250 of the yoke 132. The inner cylindrical member provides a generally circumferential outer face defining at least one groove, and particularly a first circumferential groove and a second circumferential groove spaced from the first groove. Each of the first and the second grooves is accessible along the outer face of the cylindrical member. Representative examples of such grooves include grooves 260 and 261 of the cylindrical member 250. In certain versions of the present subject matter, the shape and size of the grooves are such so as to fittingly receive the plurality of balls. For example, the shape and size of the groove closer to the pressing device, e.g., groove 260, is shaped and sized to fittingly receive the plurality of balls 366 or a first portion of the plurality of balls 366 and 368. And, the shape and size of the groove closer to the work head, e.g., groove 261, is shaped and sized to fittingly receive the plurality of balls 368 or a second portion of the plurality of balls 366 and 368.

The configuration of components also includes a cylindrically shaped ball holding part which is disposed between the inner face of the locking ring and the outer face of the cylindrical member of the yoke. An example of the ball holding part is ball holding part 362. The ball holding part defines a generally circumferential outer face and an oppositely directed and generally circumferential inner face. Upon assembly of the components such that the ball holding part is disposed between the locking ring and the cylindrical member of the yoke, the outer face of the ball holding part is directed toward the inner face of the locking ring, and the inner face of the ball holding part is directed toward the outer face of the cylindrical member of the yoke. The ball holding part also defines a plurality of apertures or ball guides and in particular, a first plurality of apertures each having a first diameter, and a second plurality of apertures each having a second diameter. The apertures or ball guides extend through the wall of the ball holding part and provide communication between the outer face and the inner face of the ball holding part. The diameter of the first plurality of apertures defined in the ball holding part such as apertures 372 for example is sized to receive the plurality of balls 368. And the diameter of the second plurality of apertures defined in the ball holding part such as apertures 370 for example is sized to receive the plurality of balls 366. Thus, the diameter of the second plurality of apertures such as 370 is greater than the diameter of the first plurality of apertures such as 372. The first plurality of apertures defined in the ball holding part, e.g., apertures 372, are arranged along a circumferential row and the second plurality of apertures in the ball holding part, e.g., apertures 370, are arranged along another circumferential row spaced from the row of the first plurality of apertures. The spaced distance between the rows of the apertures defined in the ball holding part is equal to, or substantially so, to the distance between the two grooves defined in the cylindrical member of the yoke, for example grooves 260, 261. And upon full insertion of the cylindrical member of the yoke within the ball holding part, the rows of the apertures or ball guides in the ball holding part are aligned with, and directly overlie, the grooves in the outer face of the cylindrical member of the yoke. Upon assembly of the locking ring, the ball holding part, and the cylindrical member of the yoke; and upon positioning of the locking ring to its unlocked position, the rows of the apertures or ball guides in the ball holding part are aligned with, and directly underlie, the locating grooves along the inner face of the locking ring.

In certain embodiments, the first plurality of apertures 372 are spaced equidistantly from one another along the noted circumferential row. And, the second plurality of apertures 370 are spaced equidistantly from one another along the noted circumferential row. A staggered arrangement of apertures 370, 372 can be used such as shown in FIGS. 3 and 16 for example in which an aperture 370 in one row is disposed between two adjacent apertures 372 in the other row, and an aperture 372 in its row is disposed between two adjacent apertures 370 in their row.

Figure 20:
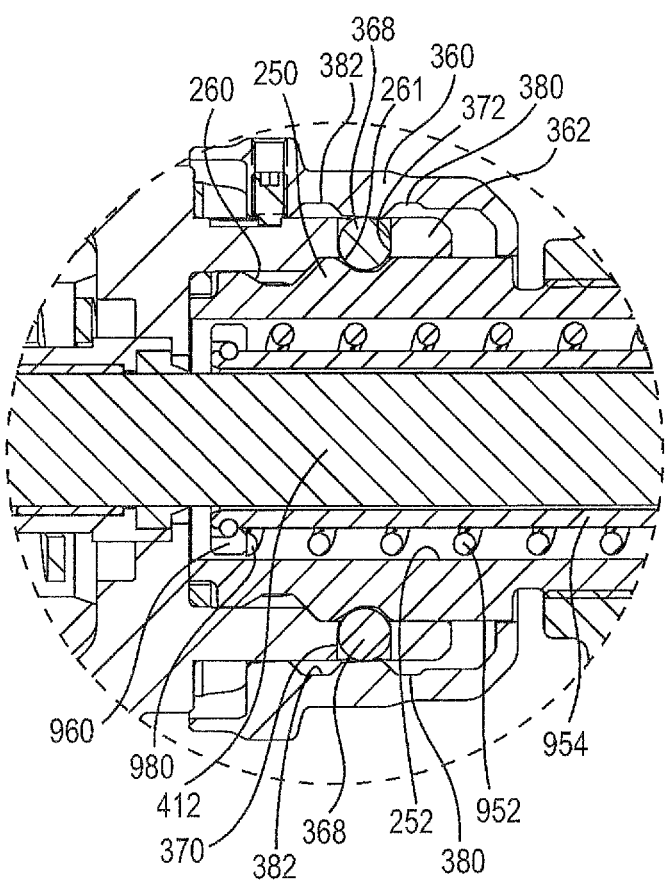
FIG. 20 is a detailed view of a region of FIG. 17.

Upon assembly of the noted components, a first plurality of balls such as balls 368 are disposed within the first plurality of apertures or ball guides 372, and a second plurality of balls such as balls 366 are disposed within the second plurality of apertures or ball guides 370. The locking ring 360 is axially positionable with respect to the ball holding part 362 (and other components), and can be positioned between a locked position such as depicted in FIGS. 18, 19, and 20, and an unlocked position in which the locking ring 360 is displaced toward the work tool. Upon axial positioning of the locking ring to its unlocked position, the locating grooves 380 and 382 in the locking ring 360 are aligned with the apertures or ball guides 372 and 370 in the ball holding part, respectively, thereby allowing the balls 368 to be partially received in the locating groove 380 and the balls 366 to be partially received in the locating groove 382. Such partial receiving position of the balls results in an interior face of the ball holding part 362 to be free of any obstructions, i.e., portions of the balls 366 and 368 projecting inward, thereby allowing axial displacement of the cylindrical member 250 within the ball holding part and along its inner face. And so, the yoke and associated work head can be removed or disengaged from the engagement assembly and work tool. Upon axial positioning of the locking ring to its locked position, the locating grooves 380 and 382 do not directly overlie the apertures 372 and 370, thus urging the balls 366, 368 into the grooves 261 and 260, respectively of the cylindrical member, and thereby engaging the cylindrical member of the yoke with the ball holding part of the engagement assembly and work tool. It should be recognized that the number of rows of the plurality of balls may be less or more than the two rows described herein and this should not limit the applicability of the previously described embodiment.

The proposed work tool 100 and interchangeable work heads 130, 500, 550, 600, 800, and 900 have advantages over the existing designs. One advantage is ease of assembly as the proposed designs of the work heads 130, 500, 550 having the screw locking mechanism 274 allows pre-tensioning of the tension type spring 264 without the need of first extending the spring. The threaded portion of the screw locking mechanism 274 can tension and/or extend the tension spring 264 as the mechanism is turned. Another advantage is that the extended elongated member 412 of the ram piston 402 aids in the alignment of the detachable work heads 130, 500, 550, and 900 with the work tool 100. By incorporating the extended elongated member 412 in the hydraulic work tool 100 and removing an otherwise required separate shank from detachable work heads 130, 500, 550, and 900 there is also a cost advantage over the existing designs having a two-piece shank. In addition, all tool and head systems can utilize the quick-connect assembly for releasably engaging a work head with the work tool.

In certain embodiments of the present subject matter, work heads are provided that include biasing provisions that bias one or more members such as movable die members to a desired position such as an open position. Generally, the biasing provisions include at least one axially oriented spring or other biasing member which is disposed about the ram piston in the work head. Various embodiments of this configuration are depicted in FIG. 5 (the work head 130 with spring 264 disposed about ram piston 402); FIG. 8 (the work head 550 with spring 552 disposed about ram piston 450); and FIG. 17 (the work head 900 with spring 952 disposed about ram piston 450).

Figure 11:
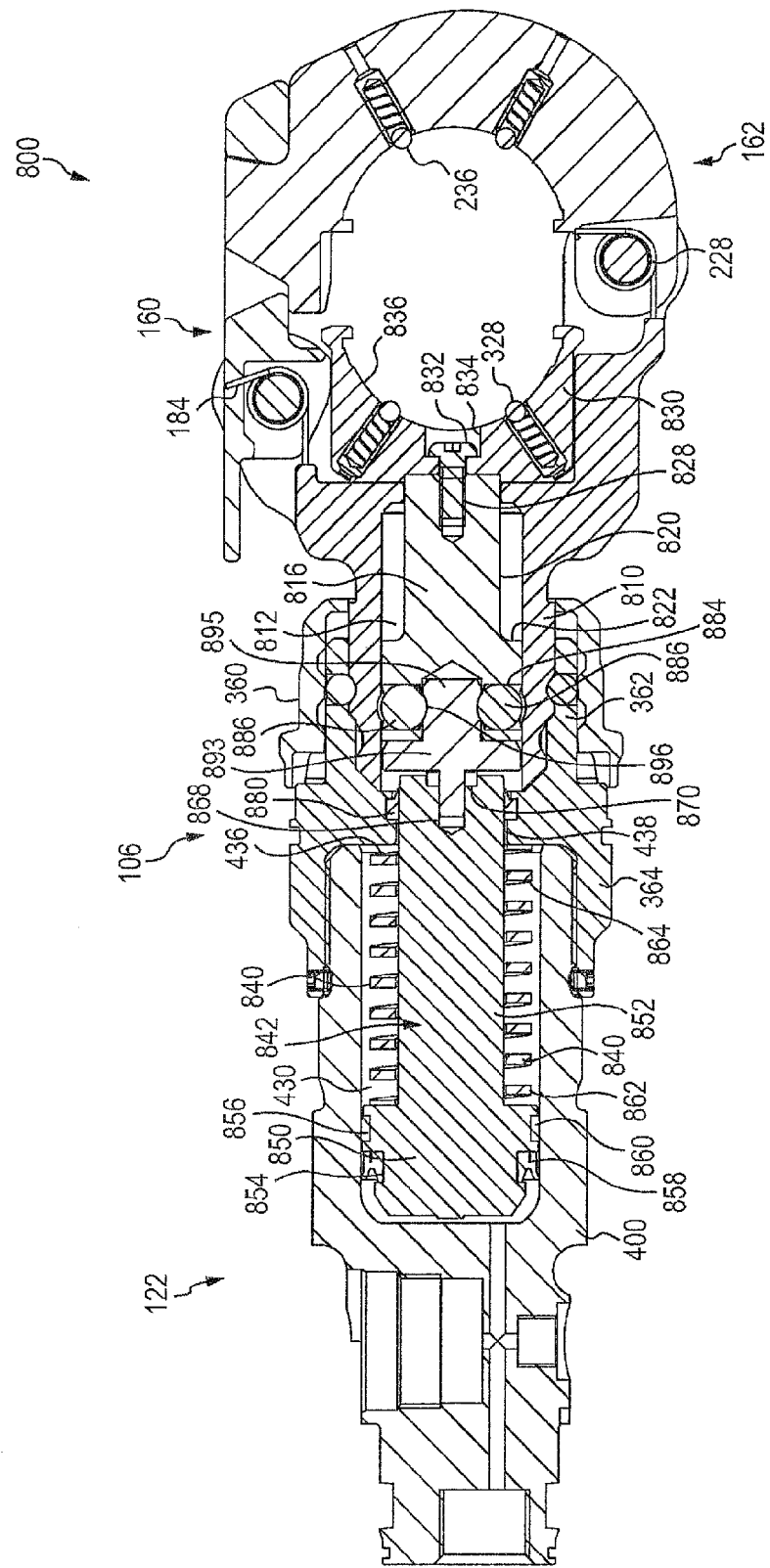
FIG. 11 is a cross-sectional view of an exemplary work head for the work tool of FIG. 1 according to yet another aspect of the present disclosure.
Figure 12:
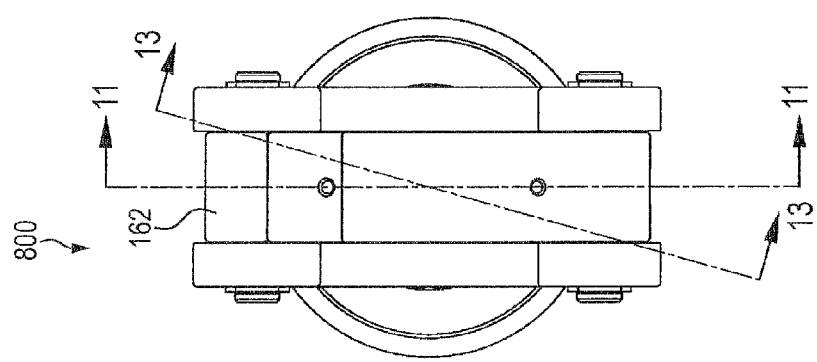
FIG. 12 is an end view of the work head of FIG. 11 illustrating two planes of cross-sections which are shown in FIGS. 11 and 13.

In still other embodiments of the present subject matter, work heads are provided that are free of such biasing means and particularly free of springs disposed about the ram piston. For example, FIG. 10 illustrates work head 600; and FIGS. 11 and 13 illustrate the work head 800 all of which are free of biasing provisions that bias one or more members of the work head such as a movable die member to an open position.

Figure 21:
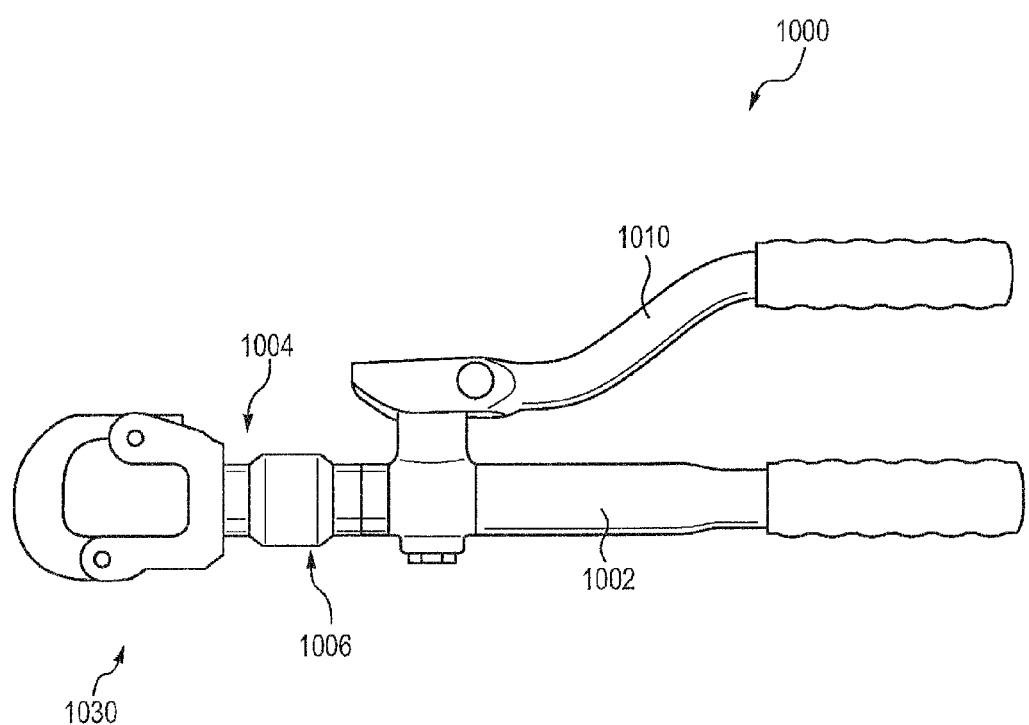
FIG. 21 is a schematic view of a handheld manual hydraulic tool having a quick-connect coupling for a detachable work head in accordance with the present disclosure.

The present subject matter includes incorporation of the various features in other tool configurations such as for example a handheld manual hydraulic tool. FIG. 21 schematically depicts a manually operated work tool 1000 having a housing 1002 with a nose end 1004 at which one or more detachable/interchangeable work heads 1030 are selectively and removably attached via a quick release coupling 1006. The tool 1000 comprises a handle 1010 which is pivotally attached to the housing 1002. The housing 1002 includes a hydraulic cylinder (not shown), a ram piston (not shown) disposed in the cylinder, and biasing provisions (not shown) associated with the ram. As will be appreciated, pivotal displacement or "pumping" of the handle 1010 displaces hydraulic fluid within the tool 1000 and ultimately results in extension of a hydraulic piston (not shown). FIG. 21 is presented to illustrate that handheld manually operated hydraulic tools can also utilize aspects and features of the present subject matter.

Figure 22:
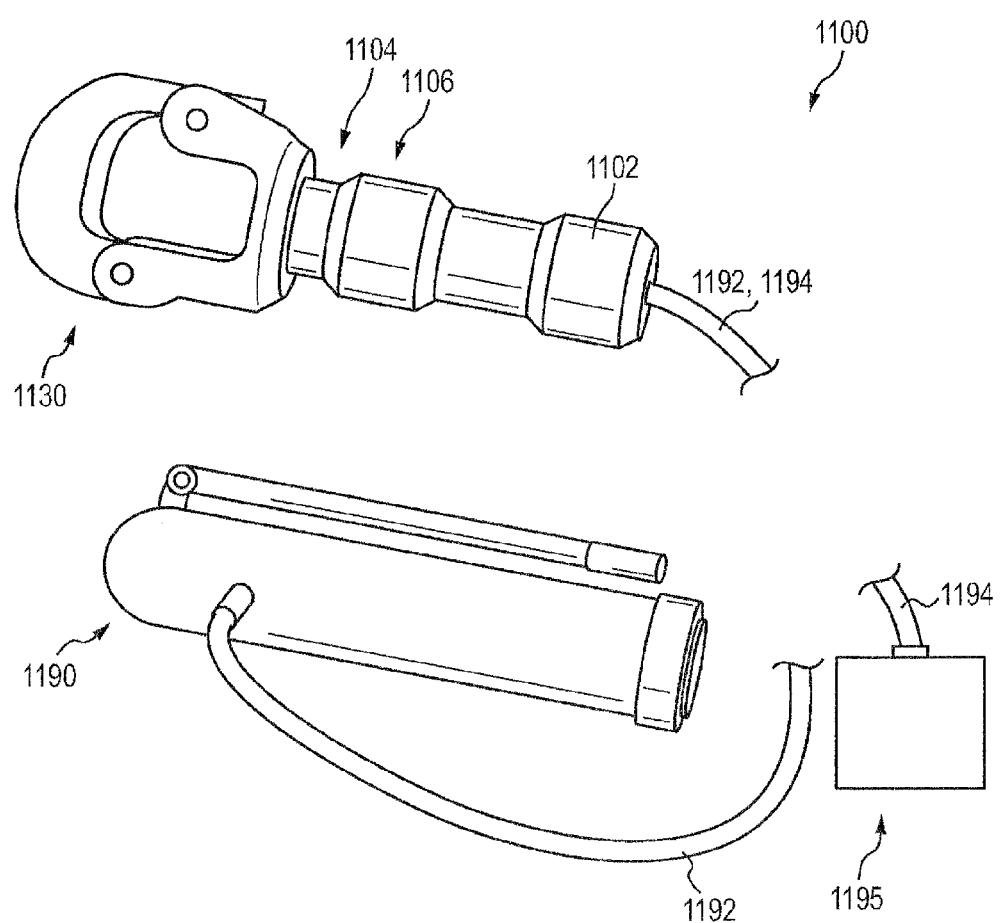
FIG. 22 is a schematic view of a remote access hydraulic tool having a quick-connect coupling for a detachable work head in accordance with the present disclosure.

The present subject matter also includes incorporation of the various features in still other tool configurations such as for example a remote access tool system. FIG. 22 schematically depicts a remote access tool system 1100 comprising a hydraulic head housing 1102 which includes a quick release coupling 1106 that enables one or more detachable/interchangeable work heads 1130 to be selectively and removably attached to the housing 1102 at a nose end 1104. The remote access system 1100 also comprises a manually powered base unit 1190 or an electrically powered base unit 1195 which provides hydraulic fluid under pressure to the head assembly housing 1102 via hydraulic flow lines 1192 or 1194, respectively. It will be appreciated that the base units 1190, 1195 typically include a hydraulic fluid reservoir, hydraulic pump, and handle or electric motor. The hydraulic head housing 1102 includes a hydraulic cylinder (not shown), a ram piston (not shown) disposed in the cylinder, and biasing provisions (not shown) associated with the ram. FIG. 22 is presented to illustrate that remote access hydraulic tools and tool systems can also utilize aspects and features of the present subject matter.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A hydraulic system comprising:
a work tool including a housing, a hydraulic cylinder or main body within the housing, a ram piston disposed in the hydraulic main body and positionable between a fully retracted position and a fully extended position, and biasing provisions associated with the ram piston and configured to bias the ram piston to the fully retracted position;
a quick release coupling mounted to the work tool for releasably connecting an interchangeable work head to the work tool, the quick release coupling including a generally cylindrical locking ring axially positionable between an unlocked position and a locked position;
wherein upon positioning the ram piston to the fully retracted position, a distal end of the ram piston extends outwardly and beyond the quick release coupling.

2. The system of claim 1 further comprising:
an interchangeable work head selectively engageable to the quick release coupling.

3. The system of claim 2 wherein the work head defines a recessed receiving region for receipt of the distal end of the fully retracted ram piston upon connecting the work head to the work tool.

4. The system of claim 2 wherein the work head includes a moveable die member that is actuated by the ram piston upon connecting the work head to the work tool.

5. The system of claim 4 wherein the work head further includes biasing provisions that bias the moveable die member to an open position.

6. The system of claim 5 wherein the biasing provisions include at least one axially oriented spring disposed about the ram piston in the work head upon connecting the work head to the work tool.

7. The system of claim 5 wherein the work head is free of springs disposed about the ram piston in the work head upon connecting the work head to the work tool.

8. The system of claim 1 wherein the quick release coupling includes (i) a generally cylindrical ball holding part defining a plurality of ball guide apertures and an open end, the ball holding part engaged with the cylinder or body of the work tool, (ii) the generally cylindrical locking ring disposed on the ball holding part and axially positionable thereon between an unlocked position and a locked position, and (iii) a plurality of balls disposed in the ball guide apertures defined in the ball holding part.

9. The system of claim 8 wherein the plurality of balls include a first plurality of balls each having a first diameter, and a second plurality of balls each having a second diameter, the second diameter being greater than the first diameter.

10. The system of claim 8 wherein the locking ring defines a generally circumferential inner face and at least one locating groove defined in the inner face.

11. The system of claim 9 wherein the locking ring defines a generally circumferential inner face and a first locating groove defined on the inner face and sized and shaped to fittingly receive the first plurality of balls.

12. The system of claim 11 wherein the locking ring further defines a second locating groove defined on the inner face, the second locating groove spaced from the first locating groove and sized and shaped to fittingly receive the second plurality of balls.

13. The system of claim 9 wherein the plurality of ball guide apertures defined by the ball holding part include a first plurality of ball guide apertures having a diameter sized to receive the first plurality of balls.

14. The system of claim 13 wherein the plurality of ball guide apertures defined by the ball holding part include a second plurality of ball guide apertures having a diameter sized to receive the second plurality of balls.

15. The system of claim 8 further comprising:
an interchangeable work head selectively engageable to the quick release coupling, wherein the work head includes a generally cylindrical member extending from the work head and sized for insertion within the open end of the ball holding part.

16. The system of claim 15 wherein the generally cylindrical member defines a circumferential outer face and at least one groove defined on the outer face.

17. The system of claim 15 wherein the cylindrical member defines a circumferential outer face and a first groove defined on the outer face and sized and shaped to fittingly receive a first portion of the plurality of balls.

18. The system of claim 17 wherein the cylindrical member defines a second groove on the outer face, the second groove spaced from the first groove and sized and shaped to fittingly receive a second portion of the plurality of balls.

19. A hand-held hydraulic assembly comprising:
a work tool having a hydraulic cylinder or main body, a ram piston disposed in the hydraulic main body and a compression type spring mounted on the ram piston; and
a quick release coupling mounted to the work tool for releasably connecting an interchangeable work head to the work tool, the coupling including (i) a generally cylindrical ball holding part defining a plurality of ball guide apertures and an open end, the ball holding part engaged with the cylinder or body of the work tool, (ii) a generally cylindrical locking ring disposed on the ball holding part and axially positionable thereon between an unlocked position and a locked position, and (iii) a plurality of balls disposed in the ball guide apertures defined in the ball holding part.

20. The assembly of claim 19, wherein the ram piston includes a one-piece elongated member having a distal end which extends outwardly from a nose end of the work tool.

21. The assembly of claim 19 wherein the plurality of balls include a first plurality of balls each having a first diameter, and a second plurality of balls each having a second diameter, the second diameter being greater than the first diameter.

22. The assembly of claim 21 wherein the plurality of ball guide apertures includes a first plurality of ball guide apertures sized to receive the first plurality of balls of the first diameter and a second plurality of ball guide apertures sized to receive the second plurality of balls of the second diameter.

23. The assembly of claim 19 wherein the locking ring defines a generally circumferential inner face and at least one locating groove defined in the inner face.

24. The assembly of claim 21 wherein the locking ring defines a generally circumferential inner face and a first locating groove defined on the inner face and sized and shaped to fittingly receive the first plurality of balls.

25. The assembly of claim 24 wherein the locking ring further defines a second locating groove defined on the inner face, the second locating groove spaced from the first locating groove and sized and shaped to fittingly receive the second plurality of balls.

26. The assembly of claim 21 wherein the plurality of ball guide apertures defined by the ball holding part include a first plurality of ball guide apertures having a diameter sized to receive the first plurality of balls.

27. The assembly of claim 26 wherein the plurality of ball guide apertures defined by the ball holding part include a second plurality of ball guide apertures having a diameter sized to receive the second plurality of balls.

28. The assembly of claim 19 further comprising:
an interchangeable work head selectively engaged to the ram piston of the work tool, wherein the ram piston is axially displaceable in the main body for actuating the work head and the work head includes a generally cylindrical member extending from the work head and sized for insertion within the open end of the ball holding part.

29. A hand-held hydraulic assembly comprising:
a work tool having a hydraulic cylinder or main body, a ram piston disposed in the hydraulic main body and a compression type spring mounted on the ram piston;
a quick release coupling mounted to the work tool for releasably connecting an interchangeable work head to the work tool, the coupling including (i) a generally cylindrical ball holding part defining a plurality of ball guide apertures and an open end, the ball holding part engaged with the cylinder or body of the work tool, (ii) a generally cylindrical locking ring disposed on the ball holding part and axially positionable thereon between an unlocked position and a locked position, and (iii) a plurality of balls disposed in the ball guide apertures defined in the ball holding part;
an interchangeable work head selectively engaged to the ram piston of the work tool, wherein the ram piston is axially displaceable in the main body for actuating the work head and the work head includes a generally cylindrical member extending from the work head and sized for insertion within the open end of the ball holding part, wherein the work head includes a tension type spring engaged with a cylindrical member, and a moveable die member connected to the tension type spring and actuated by the ram piston, the moveable die member biased to an open position by the tension type spring.

30. A hand-held hydraulic assembly comprising:
a work tool having a hydraulic cylinder or main body, a ram piston disposed in the hydraulic main body and a compression type spring mounted on the ram piston;
a quick release coupling mounted to the work tool for releasably connecting an interchangeable work head to the work tool, the coupling including (i) a generally cylindrical ball holding part defining a plurality of ball guide apertures and an open end, the ball holding part engaged with the cylinder or body of the work tool, (ii) a generally cylindrical locking ring disposed on the ball holding part and axially positionable thereon between an unlocked position and a locked position, and (iii) a plurality of balls disposed in the ball guide apertures defined in the ball holding part;
an interchangeable work head selectively engaged to the ram piston of the work tool, wherein the ram piston is axially displaceable in the main body for actuating the work head and the work head includes a generally cylindrical member extending from the work head and sized for insertion within the open end of the ball holding part, wherein the work head includes a second compression type spring engaged with a cylindrical member, and a moveable die member connected to the cylindrical member and actuated by the ram piston, the moveable die member biased in an open position by the second compression type spring.

31. The assembly of claim 28 wherein the generally cylindrical member defines a circumferential outer face and at least one groove defined on the outer face.

32. The assembly of claim 28 wherein the plurality of balls include a first plurality of balls each having a first diameter, and a second plurality of balls each having a second diameter, the second diameter being greater than the first diameter, and wherein the generally cylindrical member defines a circumferential outer face and a first groove defined on the outer face and sized and shaped to fittingly receive the first plurality of balls.

33. The assembly of claim 32 wherein the generally cylindrical member defines a second groove on the outer face, the second groove spaced from the first groove and sized and shaped to fittingly receive the second plurality of balls.

34. A work head adapted for selective engagement and disengagement from a hydraulic work tool, the work tool having a hydraulic cylinder or main body, a ram piston disposed in the hydraulic main body displaceable between extended and retracted positions, and a biasing member engaged with the ram piston, the biasing member configured to bias the ram piston to the retracted position, the work head comprising:
a guide assembly including engagement provisions for engaging a workpiece and performing at least one operation on the workpiece, the engagement provisions being positionable between an extended position and a retracted position, the guide assembly including a generally cylindrical member aligned with the ram piston and that receives a distal end of the ram piston upon engagement of the work head with a work tool;

biasing provisions disposed in the bore of the guide assembly, wherein the biasing provisions are configured to bias the engagement provisions to a retracted position;

radially outwardly biased engagement provisions for coupling the ram piston of the work tool with the generally cylindrical member of the work head.

35. The work head of claim 34 wherein the biasing provisions include a coil spring.

36. The work head of claim 35 wherein upon engagement between the work head and a hydraulic work tool, at least a portion of the ram piston of the work tool extends through at least a portion of the coil spring.

37. The work head of claim 34 wherein the work head is free of springs disposed about the ram piston in the work head.

38. The work head of claim 34 wherein the work head is adapted for selective and releasable engagement with a quick release coupling that includes (i) a generally cylindrical ball holding part defining a plurality of ball guide apertures and an open end adapted to receive the generally cylindrical member of the guide assembly, (ii) a generally cylindrical locking ring disposed on the ball holding part and axially positionable thereon between an unlocked position and a locked position, and (iii) a plurality of balls disposed in the ball guide apertures defined in the ball holding part.

39. The work head of claim 34 wherein the guide assembly of the work head is configured such that the generally cylindrical member receives the distal end of the ram piston of the work tool when the ram piston is in a fully retracted position.

* * * * *